US010679413B2

(12) United States Patent
Knight et al.

(10) Patent No.: US 10,679,413 B2
(45) Date of Patent: Jun. 9, 2020

(54) AUGMENTED REALITY APPARATUS AND METHOD

(71) Applicant: 2MEE Ltd., Heslington, York, Yorkshire (GB)

(72) Inventors: Christopher George Knight, York (GB); James Patrick Riley, York (GB); David Soppelsa, York (GB)

(73) Assignee: 2MEE LTD, Heslington, York, Yorkshire (GB)

( * ) Notice: Subject to any disclaimer, the term of this patent is extended or adjusted under 35 U.S.C. 154(b) by 0 days.

(21) Appl. No.: 15/317,011

(22) PCT Filed: Jun. 10, 2015

(86) PCT No.: PCT/GB2015/051697
§ 371 (c)(1),
(2) Date: Dec. 7, 2016

(87) PCT Pub. No.: WO2015/189606
PCT Pub. Date: Dec. 17, 2015

(65) Prior Publication Data
US 2017/0098332 A1     Apr. 6, 2017

(30) Foreign Application Priority Data

Jun. 10, 2014   (GB) .................................. 1410285.9
Jul. 24, 2014    (GB) .................................. 1413146.0
Feb. 20, 2015   (GB) .................................. 1502854.1

(51) Int. Cl.
*G06T 19/00*     (2011.01)
*H04N 5/272*     (2006.01)
(Continued)

(52) U.S. Cl.
CPC ........ *G06T 19/006* (2013.01); *G06K 9/00362* (2013.01); *G06T 7/10* (2017.01);
(Continued)

(58) Field of Classification Search
CPC .............................. G06T 19/006; H04N 5/272
See application file for complete search history.

(56) References Cited

U.S. PATENT DOCUMENTS

2002/0115047 A1   8/2002  McNitt et al.
2003/0108329 A1   6/2003  Adriansen et al.
(Continued)

FOREIGN PATENT DOCUMENTS

EP     1349382 A2    1/2003
EP     2779633 A1    9/2014
(Continued)

OTHER PUBLICATIONS

Hasup Lee, Yoshisuke Tateyama, and Tetsuro Ogi, Real-time Background Subtraction for Video Avatar, Feb. 2013, International Journal of Future Computer and Communication, vol. 2, No. 1, pp. 41-43.*

(Continued)

*Primary Examiner* — Jeffery A Brier
(74) *Attorney, Agent, or Firm* — Gesmer Updegrove LLP

(57) ABSTRACT

A method of providing an augmented reality image comprises recording a basic image including a subject and a first background using a recording device, extracting a subject image from the basic image, and providing the extracted subject image to a display device for combining with a second background. At A the sending person using the app to record a moving image of their own head—ie a video—which is separated from the background by the app (the background being automatically discarded). The image is then sent to a recipient who, at B, sees the head speak to them either on their desktop or in the camera view of the smart phone/tablet if they so choose.

11 Claims, 32 Drawing Sheets

(51) Int. Cl.
*G06T 7/10* (2017.01)
*G06T 7/194* (2017.01)
*H04N 7/18* (2006.01)
*G06K 9/00* (2006.01)

(52) U.S. Cl.
CPC .............. *G06T 7/194* (2017.01); *H04N 5/272* (2013.01); *H04N 7/18* (2013.01); *G06T 2207/20221* (2013.01); *G06T 2207/30201* (2013.01)

(56) References Cited

U.S. PATENT DOCUMENTS

| | | |
|---|---|---|
| 2006/0038833 A1 | 2/2006 | Mallinson et al. |
| 2006/0040755 A1 | 2/2006 | Choi |
| 2006/0228689 A1 | 10/2006 | Rajaram |
| 2007/0216675 A1* | 9/2007 | Sun .................. G06T 11/00 345/419 |
| 2010/0158109 A1 | 6/2010 | Dahlby et al. |
| 2010/0309225 A1 | 12/2010 | Gray et al. |
| 2011/0141254 A1 | 6/2011 | Roebke et al. |
| 2011/0249073 A1* | 10/2011 | Cranfill .............. H04N 7/147 348/14.02 |
| 2011/0275045 A1 | 11/2011 | Bhupathi et al. |
| 2012/0200743 A1 | 8/2012 | Blanchflower et al. |
| 2012/0206577 A1 | 8/2012 | Guckenberger et al. |
| 2012/0327172 A1* | 12/2012 | El-Saban .......... G06K 9/00228 348/14.02 |
| 2013/0050395 A1* | 2/2013 | Paoletti .............. H04N 7/142 348/14.02 |
| 2013/0135295 A1 | 5/2013 | Li et al. |
| 2014/0002677 A1 | 1/2014 | Schinker |
| 2015/0091891 A1* | 4/2015 | Raheman ............ A63G 31/16 345/419 |
| 2015/0195626 A1 | 7/2015 | Lee et al. |

FOREIGN PATENT DOCUMENTS

| | | |
|---|---|---|
| GB | 2462780 A | 2/2010 |
| GB | 2508070 A | 5/2014 |
| JP | 2012216077 A | 11/2012 |
| KR | 1020120122512 A | 11/2012 |
| WO | 02069272 A3 | 6/2002 |
| WO | 2011067469 A1 | 6/2011 |
| WO | 2012061804 A1 | 5/2012 |
| WO | 2014041352 A1 | 3/2014 |

OTHER PUBLICATIONS

Phillip Ian Wilson and John Fernandez, Facial feature detection using Haar classifiers, Apr. 2006, Journal of Computing Sciences in Colleges, vol. 21, Issue 4, pp. 127-133.*
Chia-Wen Lin, Yao-Jen Chang, Yung-Chang Chen, and Ming-Ting Sun, Implementation of a Realtime Object-Based Virtual Meeting System, Aug. 2001, 2001 IEEE International Conference on Multimedia and Expo, ICME 2001, pp. 565-568.*
Christian J. Breiteneder, Simon J. Gibbs, and Costas Arapis, TELEPORT—An Augmented Reality Teleconferencing Environment, Feb. 1996, Virtual Environments and Scientific Visualization '96, Proceedings of the Eurographics Workshops in Monte Carlo, Monaco, Springer, Vienna, pp. 41-49. (Year: 1996).*
Search Report issued by the European Intellectual Property Office dated Jul. 20, 2015 in Great Britain Application No. GB1502854.1.
International Search Report and Written Opinion issued by the International Searching Authority dated Sep. 28, 2015 in related International Application No. PCT/GB2015/051697, 10 pages.
International Preliminary Report on Patentability issued by the International Bureau of WIPO dated Dec. 15, 2016 in related International Application No. PCT/GB2015/051697, 8 pages.
International Search Report and Written Opinion issued by the International Searching Authority dated Jun. 15, 2015 in related International Application No. PCT/GB2015/050832, 8 pages.
International Preliminary Report on Patentability issued by the International Bureau of WIPO dated Sep. 20, 2016 in related International Application No. PCT/GB2015/050832, 6 pages.
Par2Pro: Swinguru at the PGA Expo 201 by Par2Pro, Aug. 22, 2013, XP054975880, Retrieved from internet: URL:https://www.youtube.com/watch?v=PmHSyDw0MQs, retrieved on Aug. 19, 2019, 1 page.
Li et al., Video Object Cut and Paste, Jul. 31, 2005, ACM, ACM SIGGRAPH 2005 Papers, (Year: 2005), 6 pages.
Search Report and Examination Opinion issued by the European Intellectual Property Office dated Jul. 21, 2015 in related Great Britain Application No. GB1504754.1.
International Search Report and Written Opinion issued by the International Searching Authority dated Jan. 15, 2014 in related International Application No. PCT/GB2013/052382, 8 pages.
International Preliminary Report on Patentability issued by the International Bureau of WIPO dated Mar. 17, 2015 in related International Application No. PCT/GB2013/052382, 5 pages.

* cited by examiner

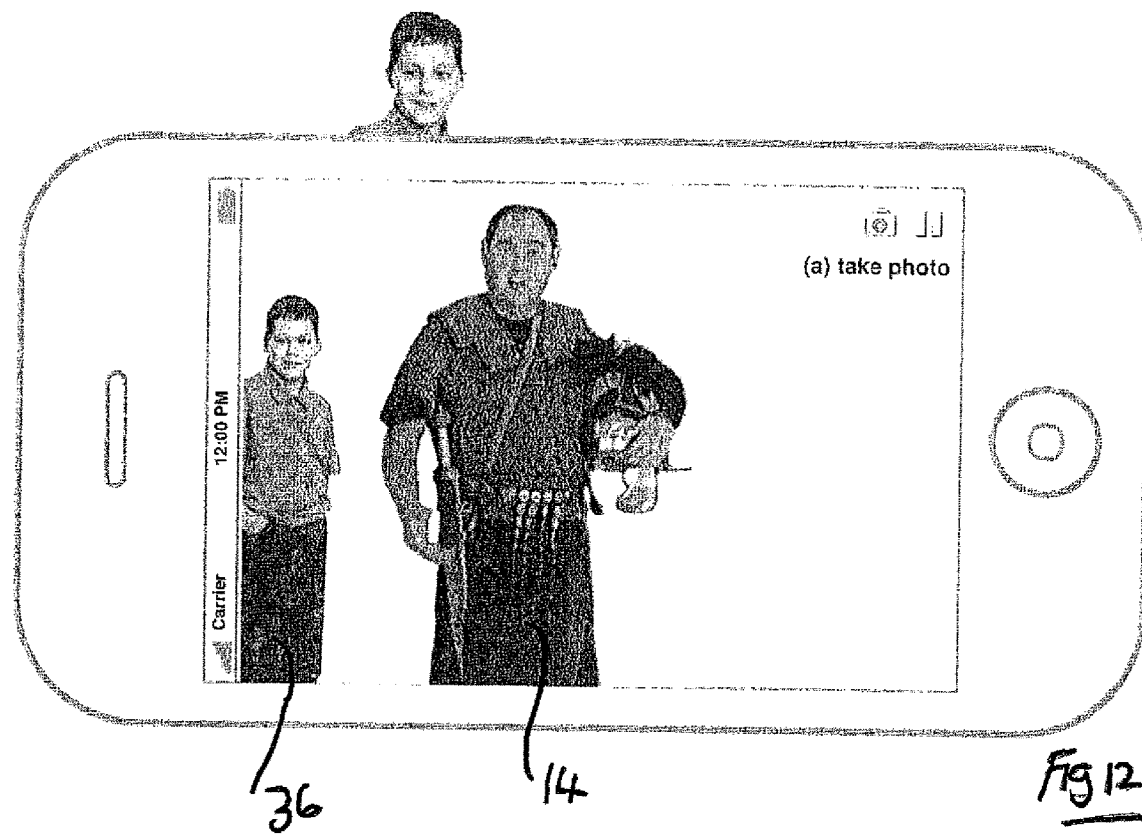
Fig 12
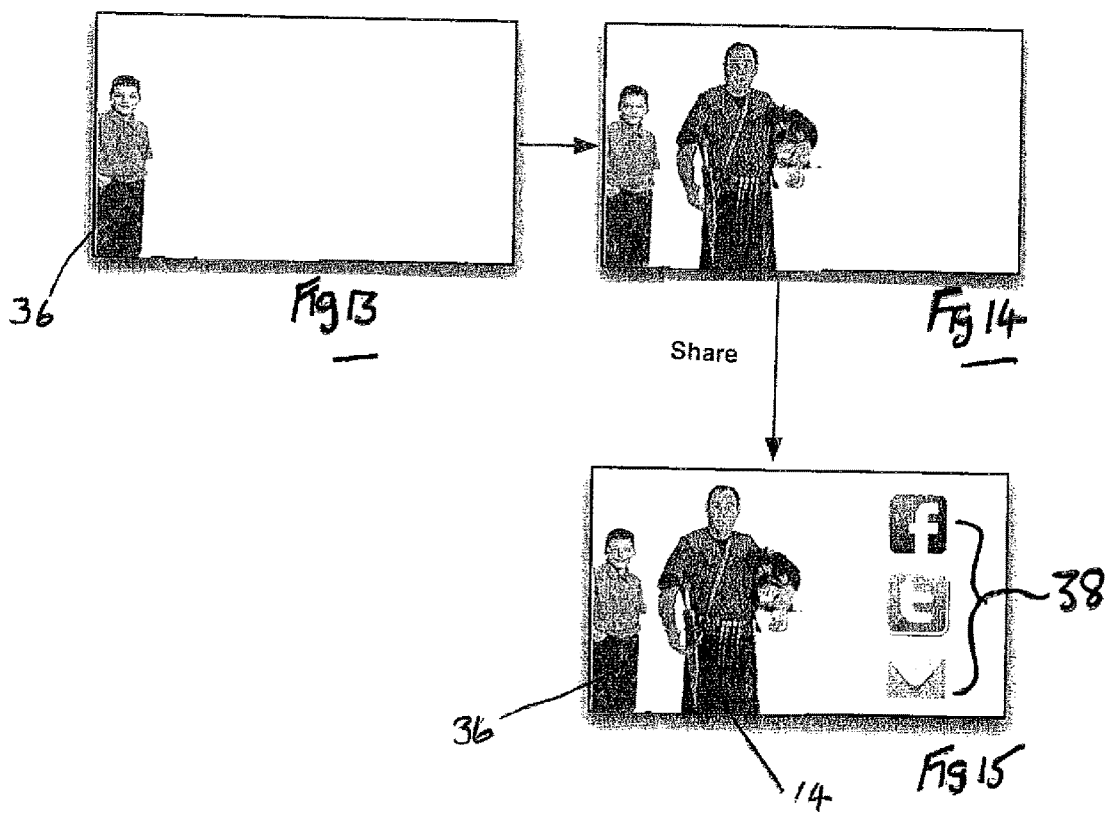
Fig 13  Fig 14  Share  Fig 15

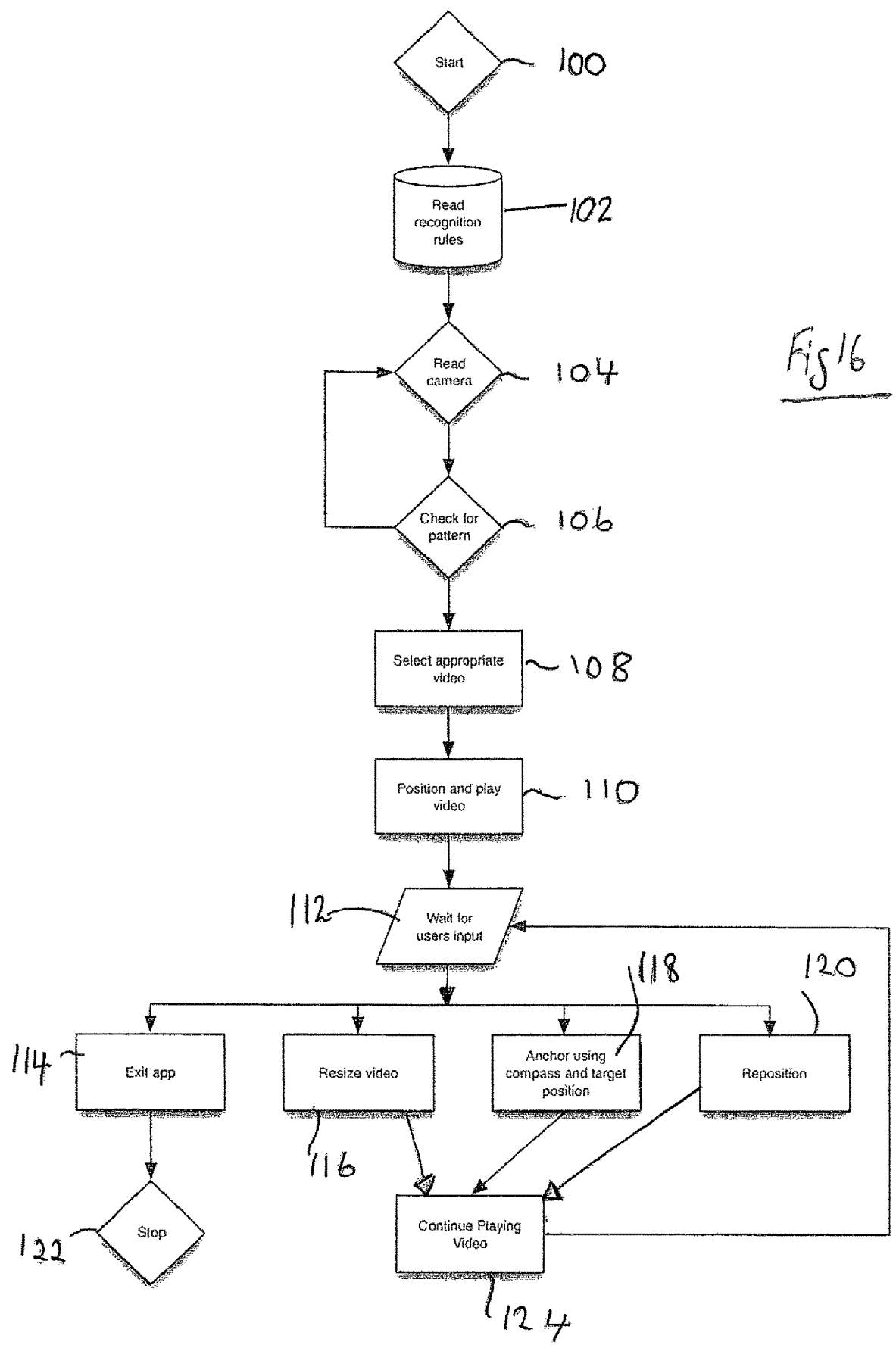

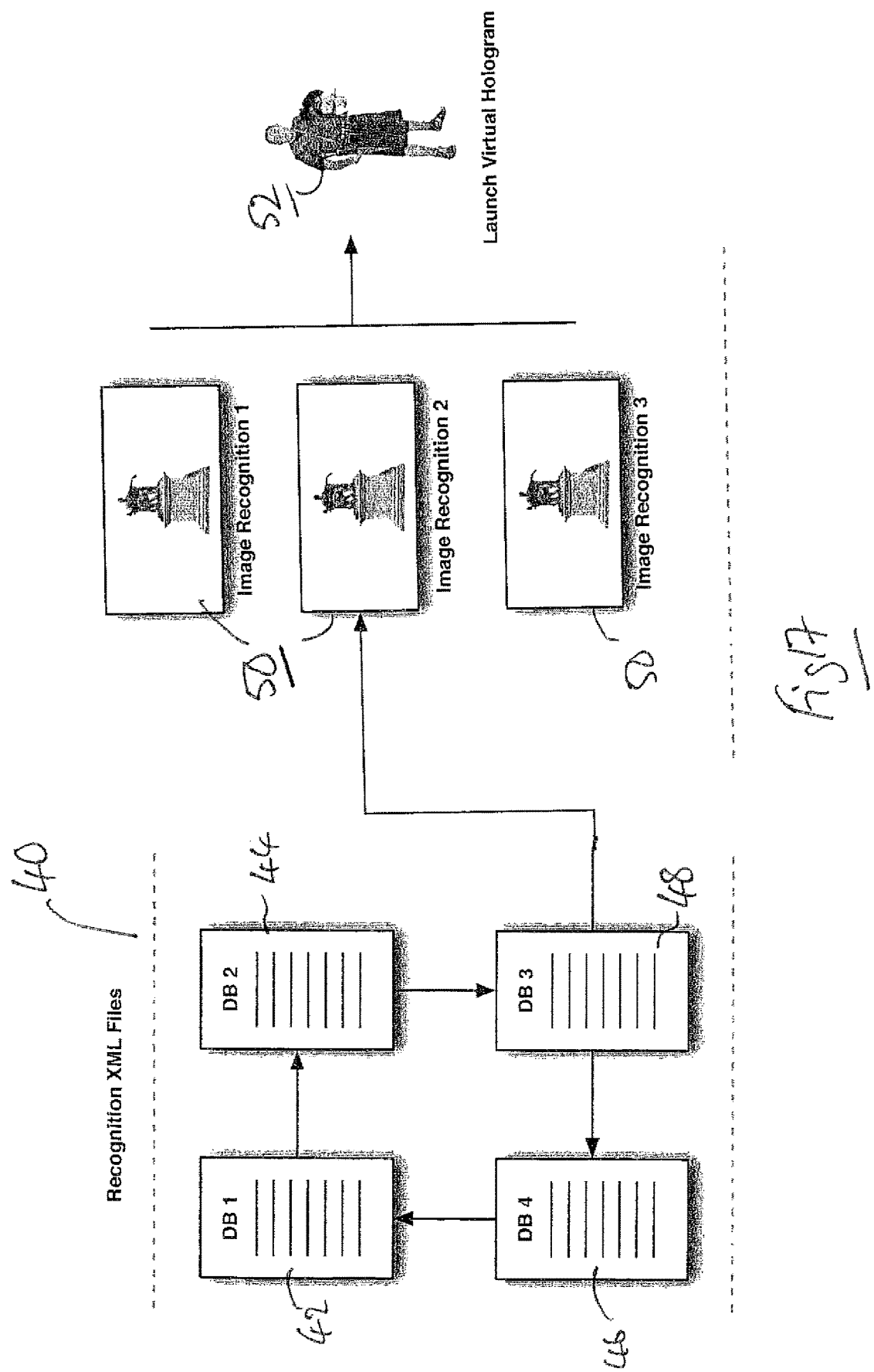

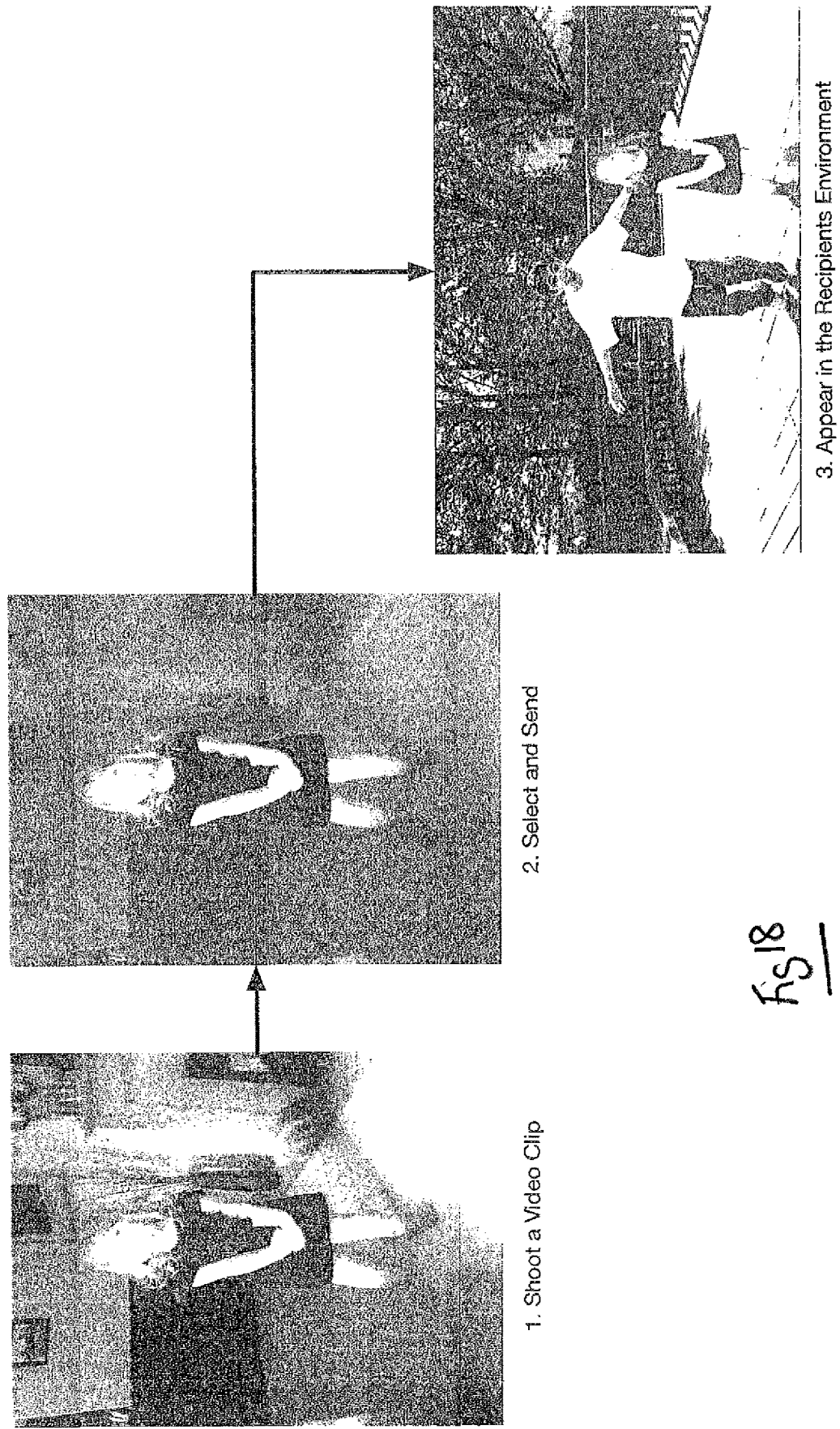

Take a Video Sequence

- User takes a video sequence of a 2me 'object'
- The video sequence is monitored for optimum duration
- Premium users may have a longer 2me video sequence
- The user will decide to keep or delete the video sequence. If accepted, the methodology moves forward

Edit the First Frame

- Once the user is happy with the video sequence they are presented with the first frame
- This first frame will be used to identify the object
- Once the object has been identified it will be tracked through the system frame-by-frame

- The user selects the object by either
  — the whole image will be grayscale and the user will use their finger to highlight the object by replacing the missing colour values. This method forms boundary edges or — the user will select around the object forming a 'halo' to define the boundary edges

- For immediate purposes the 1st technique will be explained

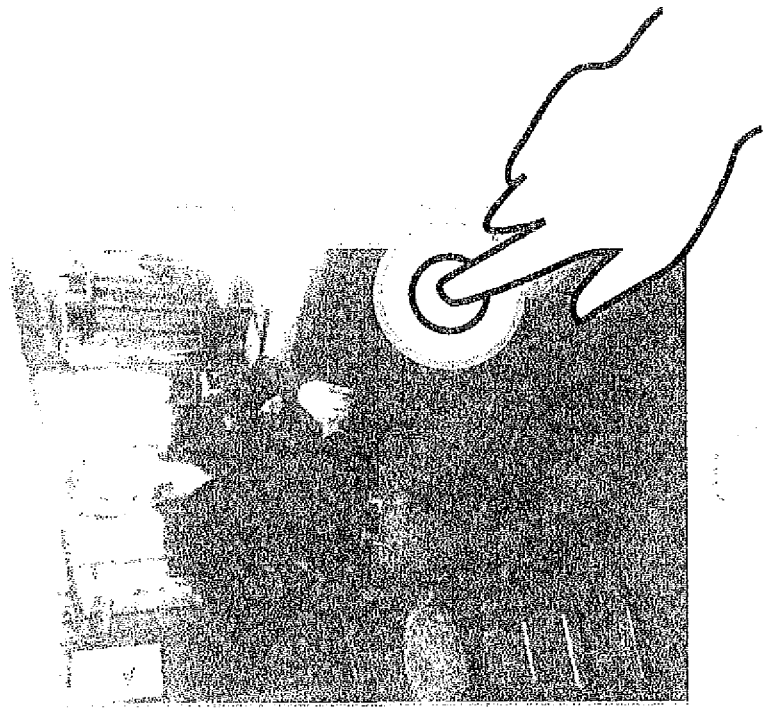

Fig 20

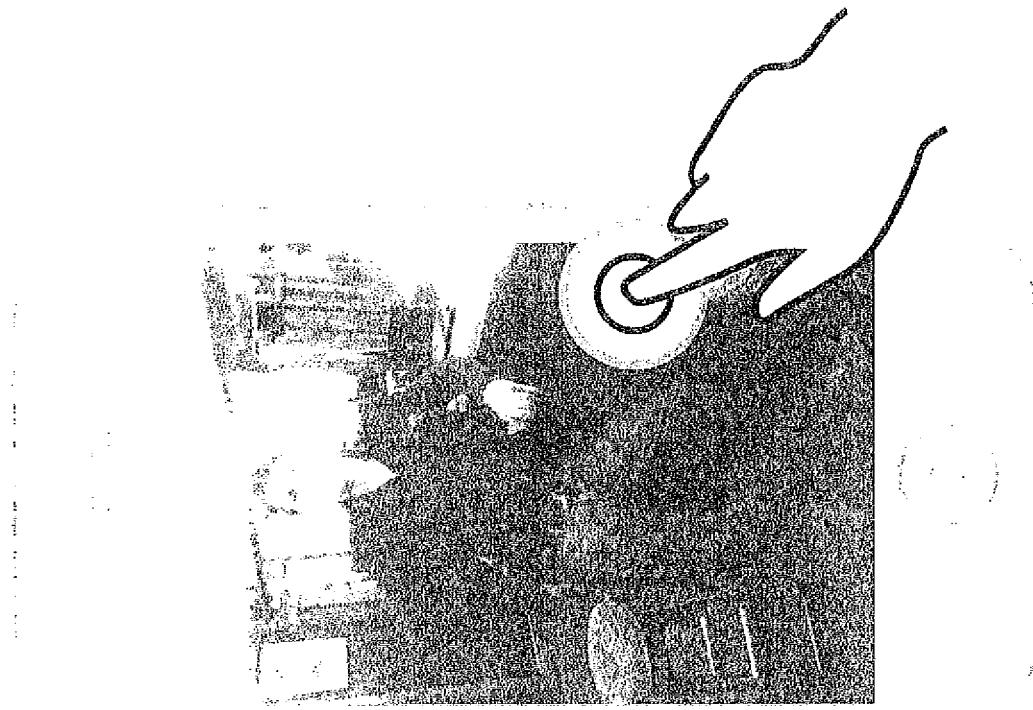

Select the Object

- The user uses there index finger (normally) to select the object
- The app will allow for different size area selectors, as well as a zoom feature for minute accuracy.
- The app will also allow for a solid colour overlay to show any areas of the object that have been missed by the user
- Once the user is happy with the object selected, they will then pass the object to the next stage of the methodology

Fig 21

Realise the Background

- The object selected, now allows for inverse recognition of the background
- The background will be selected and deleted from the object
- The background will be filled with a solid defined colour to allow for normal 2Me processes

Track the Object

- The initial frame has now been decided
- The system will now analyse each frame:
  - 1. Follow the motion of the object
  - 2. Delete the background information
  - 3. Replace background with solid colour
- Once each frame has been rendered they can be 'stitched' back together into a video sequence, or returned as a set of frames.
- This may be completed on the mobile device, or may be completed off-device on an external computing system where it will be returned to the user's device once ready
- The user will decide whether the 2Me is as they require. If they wish to keep it will be stored both on the device alongside a version within the 2Me Hub.
- This rendered 2Me can then be sent to any other user who has the 2Me app technology installed on their device

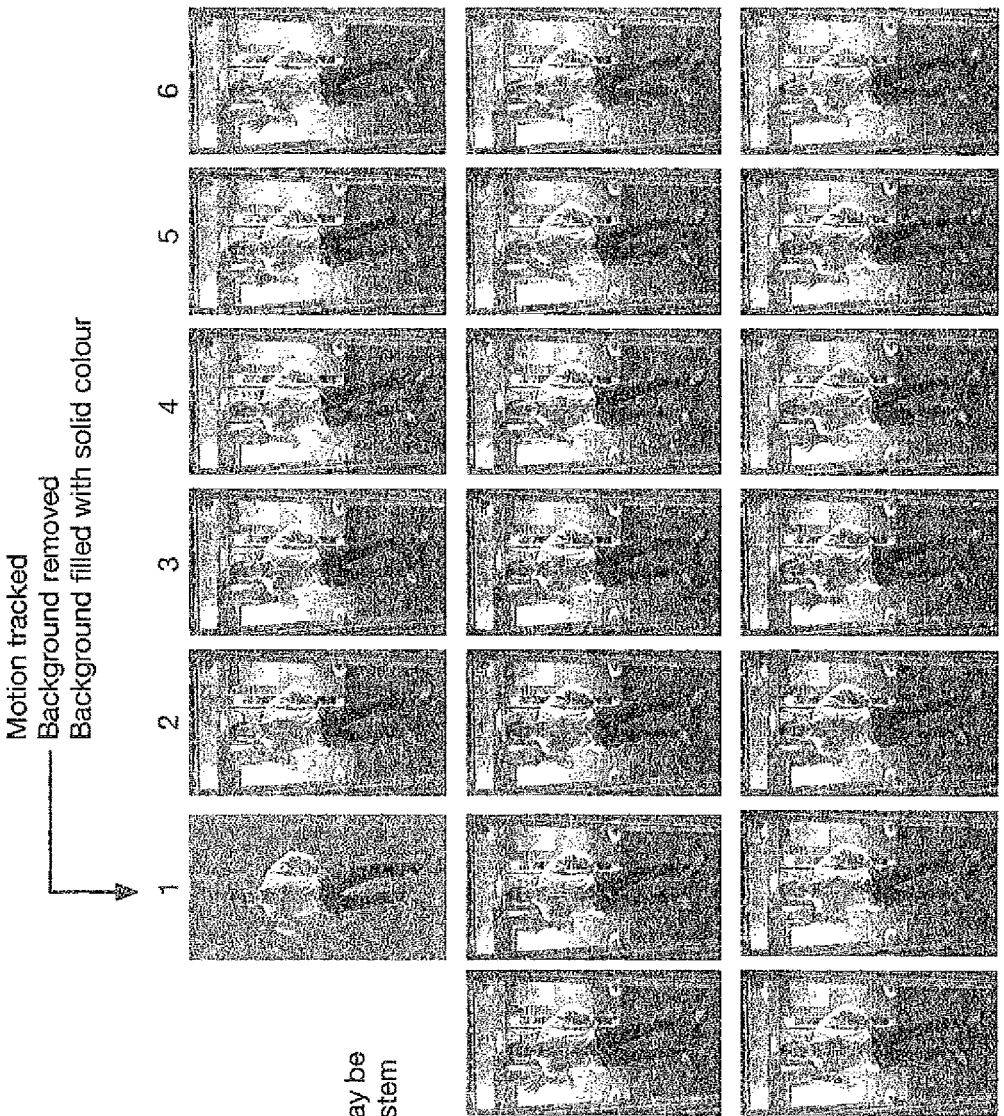

Fig 23

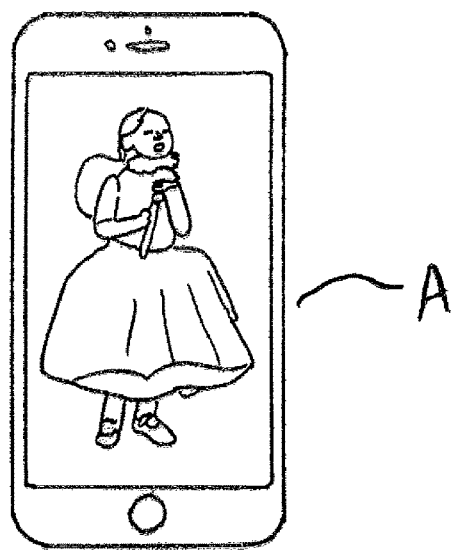
Fig 31
A
B
C

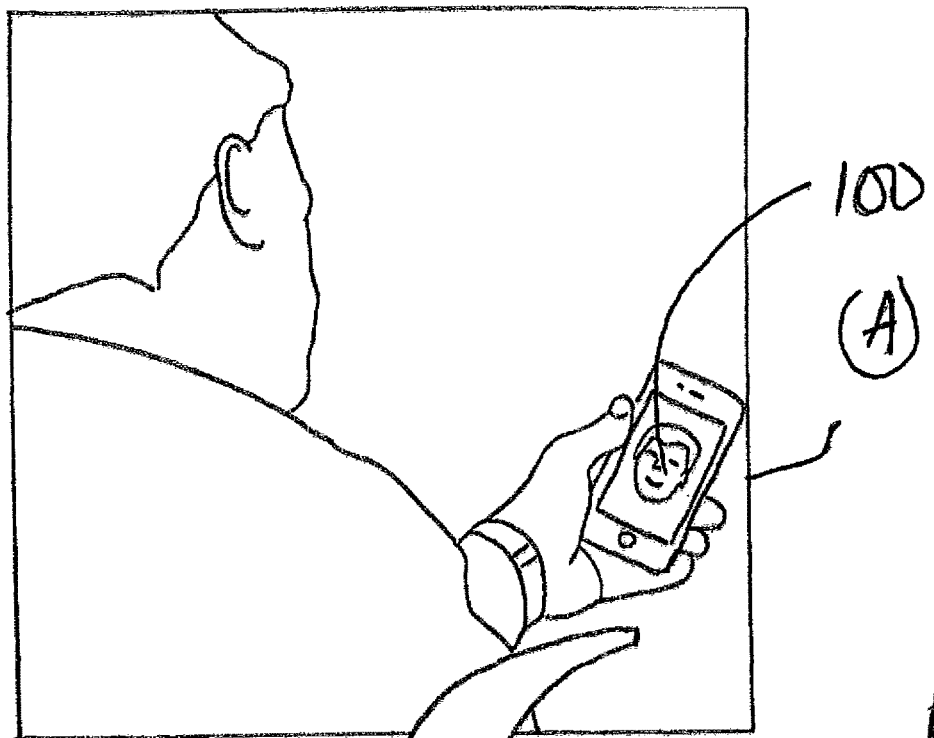
Fig 33
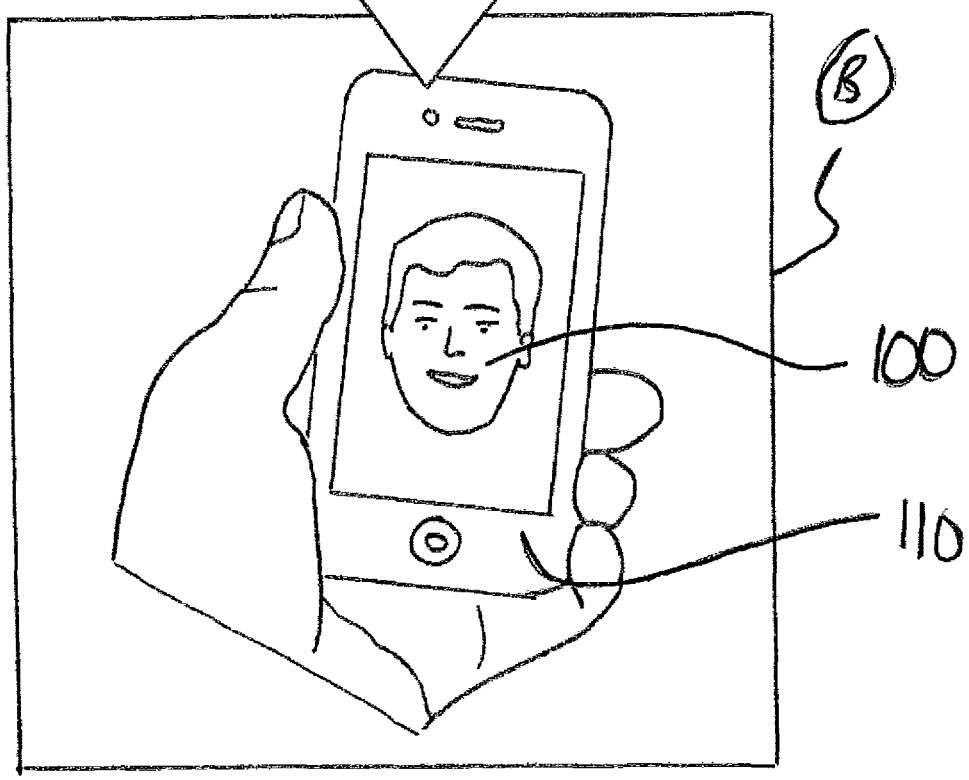

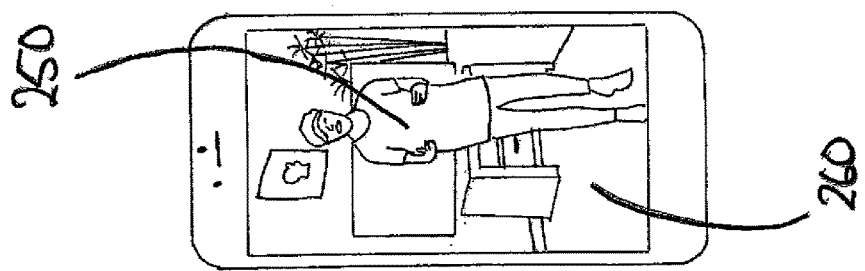
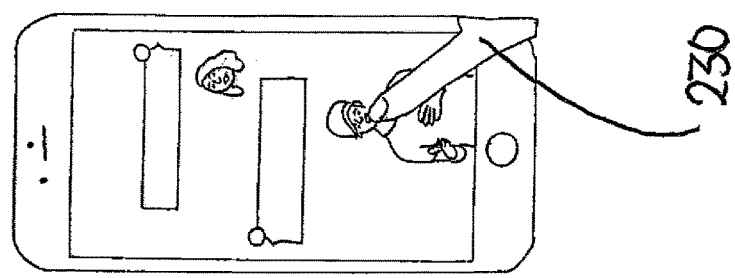
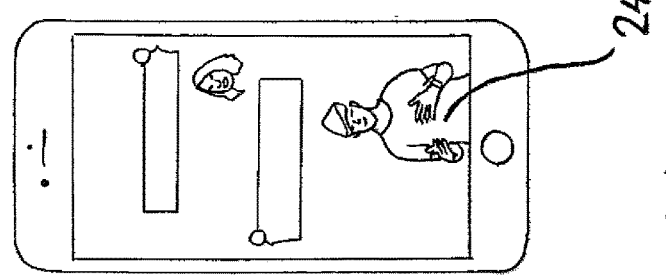
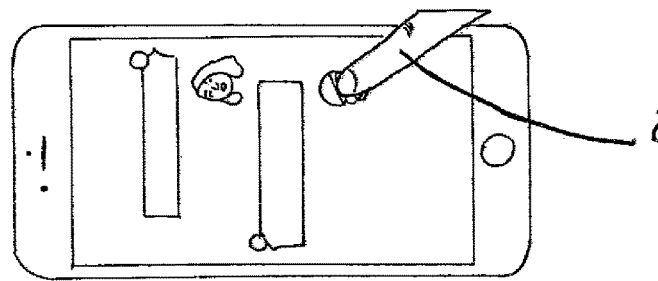
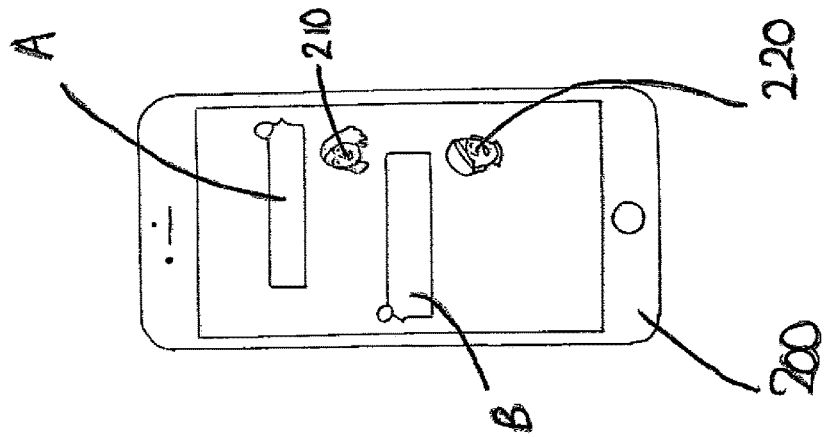
fig 34

AUGMENTED REALITY APPARATUS AND METHOD

PRIORITY INFORMATION

The present application claims priority to and is a National Stage Entry application of PCT Application No. PCT/GB2015/051697 filed Jun 10, 2015, that claims priority to GB Application No. 1410285.9, filed on Jun 10, 2014, and to GB Application No. 1413146.0, filed on Jul 24, 2014 and to GB Application No. 1502854.1, filed on Feb. 20, 2015, each of which is incorporated herein by reference in its entirety.

The present invention relates to an apparatus and a method for providing an augmented reality experience.

Augmented reality, in which the viewing of a real world environment is enhanced using computer generated input, is becoming available on various platforms, including television, head up displays, and to a limited extent, hand held devices such as cell phones.

The use of hand held devices, such as cell phones, as cameras has been enhanced by the availability of small, specialised downloadable programs, known informally as apps. Many of these include computer generated visual effects that can be combined with a "live view" through the camera, to provide the user with a degree of augmented reality for an improved image or amusement. However the incorporation of video footage into the live view of a camera has proved to be difficult due to the limited processing power available in most hand held devices, and the lack of a functional codebase provided with the built-in frameworks.

Our published UK patent application, GB 2 508 070 describes examples of techniques for generating effective augmented reality experiences on hand-held devices.

Embodiments of the present invention aim to provide apparatus and a method for capturing an image of a subject on a camera device, extracting the image from a background and sharing the extracted image.

Embodiments of the present invention also aim to provide a system and method for sharing images to be used in augmented reality displays.

The present invention is defined in the attached independent claims to which reference should now be made. Further, preferred features may be found in the sub-claims appended thereto.

According to one aspect of the present invention there is provided a method of providing an augmented reality image, the method comprising recording a basic image comprising a subject and a first background using a recording device, extracting a subject image from the basic image, and providing the extracted subject image to a display device for combining with a second background.

The second background may comprise any of, but not limited to: a desktop background, e.g. a display screen of a device, a background provided by an application or a background captured by a camera. The background may be captured by a camera of a device on which the subject image is to be viewed.

Preferably the extracted subject image is provided to the display device for combining with a second background as imaged by a camera of the display device.

In one embodiment the recording device and the display device are parts of a common device, which may be a hand-held device. Alternatively or in addition the recording device and the display device may be separate and may be located remotely. The recording device and display device may each be part of separate devices, which devices may be hand-held devices and which devices may comprise, but are not limited to, mobile telephones and tablets.

The recording and display devices may comprise different types of device.

In a preferred arrangement the first and second backgrounds are temporally and/or spatially separate. The first background may comprise an image that is contemporaneous with the subject image and the second background may comprise an image that is not contemporaneous with the subject image.

In a preferred arrangement the step of extracting the subject from the basic image is performed locally with respect to the recording device, and preferably within the device. Alternatively, the step of extracting the subject image from the basic image may be performed remotely from the recording device.

The step of extracting the subject image from the basic image may be performed in real time, with respect to the recording of the basic image, or else may be performed after recording of the basic image.

Preferably the method comprises sending the extracted subject image from one device to another device. The image is preferably a moving image, and more preferably a moving, real-world image.

The extracted subject image may comprise a head and/or face of a user, such as of a sender of the image. The image is more preferably a moving image and may include, be attached to, or be associated with, an audio file, such as a sound recording of, or belonging to, the moving image.

The image may include one or more graphical elements, for example an augmented reality image component. The augmented reality image component may be anchored to the extracted subject image so as to give the appearance of being a real or original element of the extracted subject image.

In a preferred arrangement the method includes sending an extracted subject image, preferably a moving image, over a network to a recipient for viewing in a recipient device. Optionally a sound recording may be sent with the extracted subject image. Alternatively, or additionally, the method may include sending the extracted subject image directly to a recipient device.

In a preferred arrangement, the method comprises recording a basic image comprising a subject and a first background, extracting a subject from the background as a subject image, sending the subject image to a remote device and combining the subject image with a second background at the remote device.

The method may include extracting a subject from a basic image by using one or more of the following processes: subject feature detection, subject colour modelling and subject shape detection.

According to another aspect of the present invention there is provided apparatus for providing an augmented reality image, the apparatus comprising a camera for recording a basic image comprising a subject and a first background using a recording device, an image processor for extracting a subject image from the basic image, and a display device for combining the extracted subject image with a second background.

Preferably the extracted subject image is arranged in use to be combined with the second background as imaged by a camera of the display device.

In one embodiment the recording device and the display device are parts of a common device, which may be a hand-held device. Alternatively or in addition the recording device and the display device may be separate and may be located remotely. The recording device and display device may each be part of separate devices, of which one or both may be a hand held device.

In a preferred arrangement the first and second backgrounds are temporally and/or spatially separate. The first background may comprise an image that is contemporaneous with the subject image and the second background may comprise an image that is not contemporaneous with the subject image.

The processor may be arranged in use to extract the subject from the basic image locally with respect to the recording device, and preferably within the device. Alternatively, the processor may be arranged in use to extract the subject image from the basic image remotely from the recording device.

The processor may be arranged in use to extract the subject image from the basic image in real time, with respect to the recording of the basic image. Alternatively, the processor may be arranged in use to perform the extraction after the recording of the basic image.

The subject image may comprise one that has been previously stored.

The subject image may comprise a sequence of still images taken from a moving video.

Alternatively or additionally the subject image may comprise a continuous moving video image.

The subject image may comprise an image of a person or creature, or could be any other "real world" object or item.

For viewing the image, a context identification unit may be arranged in use to identify a context for the subject image. This may be achieved by comparing at least one object in a field of view with stored data from a plurality of objects. An image retrieval unit may be arranged to select an image from a plurality of stored images according to context information determined by the context identification unit. A positioning unit may be arranged in use to position the subject image in a background. This may be achieved according to context information determined by the context identification unit.

The positioning of the subject image by the positioning unit may include sizing of the subject image in the display, and may include anchoring the subject image in the display, preferably with respect to context information determined by the context identification unit.

The context identification unit, and/or the retrieval unit, and/or the positioning unit may comprise processes arranged in use to be performed by one or more electronic processing devices.

The invention also provides a program for causing a device to perform a method of providing an augmented reality image, the method comprising recording a basic image comprising a subject and a first background using a recording device, extracting a subject image from the basic image, and providing the extracted subject image to a display device for combining with a second background.

The program may be contained within an app. The app may also contain data, such as subject image data and/or background image data.

The invention also provides a computer program product, storing, carrying or transmitting thereon or therethrough a program for causing a device to perform a method of providing an augmented reality image, the method comprising recording a basic image comprising a subject and a first background using a recording device, extracting a subject image from the basic image, and providing the extracted subject image to a display device for combining with a second background.

According to another aspect, there is provided a messaging system, comprising a plurality of devices wherein at least a first, sending user device is arranged in use to send an image to at least a second, receiving user device, which image comprises an electronically captured image, for displaying as a virtual image in an augmented reality on a display of the second user device.

The devices may be arranged to communicate directly, and/or via a communications network including a processor-based server.

In a preferred arrangement, at least the receiving user device comprises a context identification unit for identifying a context from at least one real image captured by the device, and a virtual image positioning unit for positioning the virtual image in the display.

Preferably the virtual image is one that has been previously stored.

In a preferred arrangement the virtual image comprises a sequence of still images taken from a moving video.

Alternatively or additionally the virtual image may comprise a continuous moving video image.

The virtual image may comprise an image of a person or creature, or could be any other "real world" object or item.

In a preferred arrangement the context identification unit is arranged in use to identify a context by comparing at least one object in a field of view with stored data from a plurality of objects. The image retrieval unit is preferably arranged to select an image from a plurality of stored images according to context information determined by the context identification unit. The positioning unit is preferably arranged in use to position the virtual image according to context information determined by the context identification unit.

The positioning of the image by the positioning unit may include sizing of the image in the display, and may include anchoring the image in the display, with respect to context information determined by the context identification unit.

The context identification unit, and/or the virtual image retrieval unit, and/or the virtual image positioning unit may comprise processes arranged in use to be performed by one or more electronic processing devices.

The virtual image may comprise an extracted subject image according to any statement herein.

The invention also includes a method of sending an image from one device to another device wherein at least a first, sending user device sends an image to at least a second, receiving user device, which image comprises an electronically captured image, and the image is displayed as a virtual image in an augmented reality on a display of the second user device.

The image may be sent via a communications network including a processor-based server.

The image may be according to any statement herein.

The invention may include any combination of the features or limitations described herein, except such a combination of features as are mutually exclusive.

Preferred embodiments of the present invention will now be described by way of example only with reference to the accompanying diagrammatic drawings in which:

FIGS. 12-15 show schematically different steps in a process for taking a photograph incorporating both a real and a virtual image, according to an embodiment of the present invention;

FIG. 16 shows schematically a process for acquiring video footage incorporating both real and virtual images;

FIG. 17 is a schematic flow diagram showing some key steps in the process of displaying a virtual image in the live view of a camera, in accordance with an embodiment of the present invention;

FIGS. 18-23 show a method for extracting a subject image from a background and sending the extracted image to a remote device;

FIGS. 19-31 show a messaging platform according to an embodiment of the present invention;

FIGS. 32 and 33 shows a number of extracted subject images displayed on screens of recipient devices, in accordance with an embodiment of the present invention;

FIG. 34 shows a further embodiment of messaging according to the present invention.

The embodiment described below aims to provide an augmented reality experience to a user of a hand held device, such as a mobile phone, which incorporates an electronic processor, a camera and a display. In particular, images taken from video footage are displayed in a display of a hand held device together with a live camera view, to create the illusion that the subject of the video—ie the virtual moving image—is present in the field of view of the camera in real time.

In this context the term "real world" image means an image taken from reality, such as a physical, real-world scenario using an electronic photo-capture technique, e.g. video recording.

In order to achieve this the device must undertake various processes, including acquiring contextual information from the camera view, obtaining an appropriate virtual image, positioning the virtual image within the camera view, optionally anchoring the virtual image with respect to the context and optionally sizing the virtual image within the camera view.

The processes may be performed by an electronic processor of the hand held device.

The data necessary for the reconstruction of the virtual moving image, together with one or more programs for facilitating the necessary processes for manipulating it to provide the augmented reality experience, are downloadable to a hand held device in the form of a specialist program, or software application, known widely as an app. The app can preferably be updated to present the user with fresh viewing experiences.

The first example described in detail below is that of an augmented reality system for use as a guide at a visitor attraction, in which a virtual image of a figure is displayed within the real world camera view to provide information, via an associated audio file, about the attraction.

Figure 1:
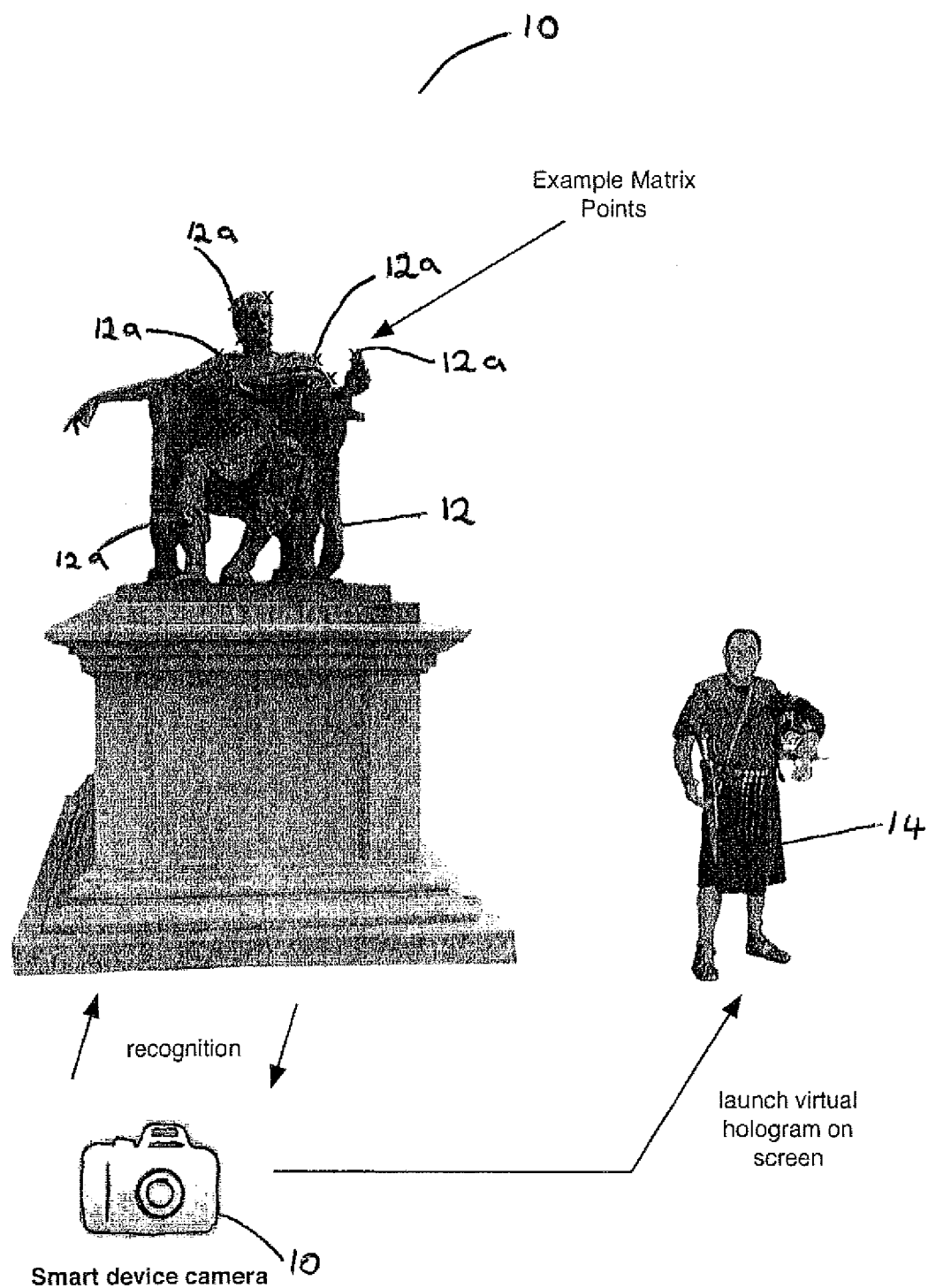
FIG. 1 shows a virtual image superimposed upon a camera view of a real image, in accordance with an embodiment of the present invention.

Turning to FIG. 1, this shows schematically a camera 10 of a hand held device, in this case aimed at a well-known object 12, which is recognisable to the device, and a moving virtual image 14 of an actor playing the part of an historical figure that is chosen because of its relevance to the object 12. The device recognises the object, in this case a statue, based upon a unique set of matrix points 12a which have been stored in the downloaded app in an earlier stage, and which can provide the device with contextual information necessary for the subsequent selection, display and manipulation of the virtual image 14.

Moving virtual images 14 are stored in the device as sequences of still images taken from a video file, and synchronised with an appropriate audio file, when the app is downloaded and the appropriate one is chosen after the context has been determined.

Figure 2:
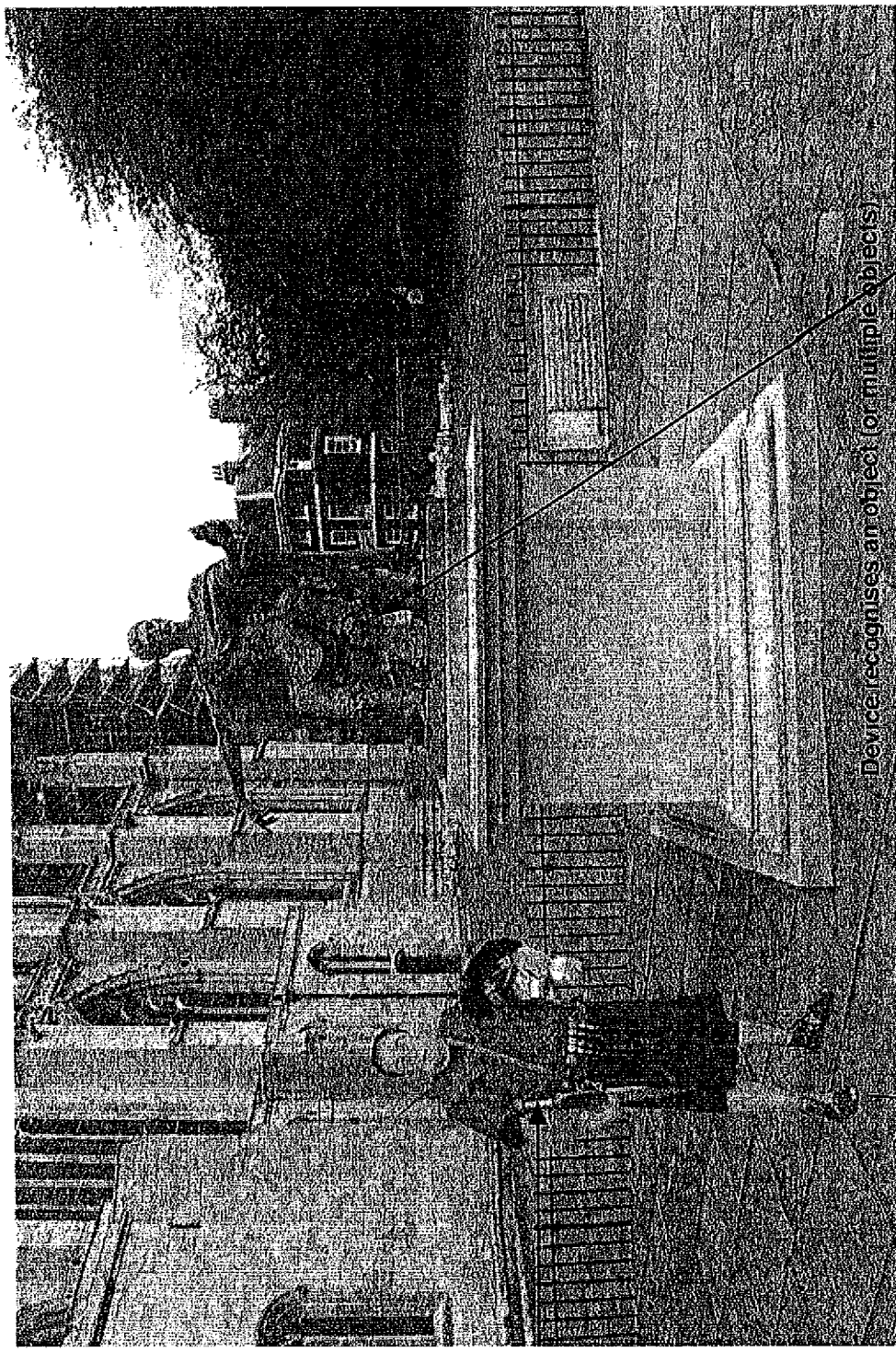
FIG. 2 shows schematically a first step in a context recognition process in accordance with an embodiment of the present invention.

Turning to FIG. 2, this shows the chosen virtual image 14 as it is displayed in the camera view of the device, beside the object 12.

Figures 3, 3A:
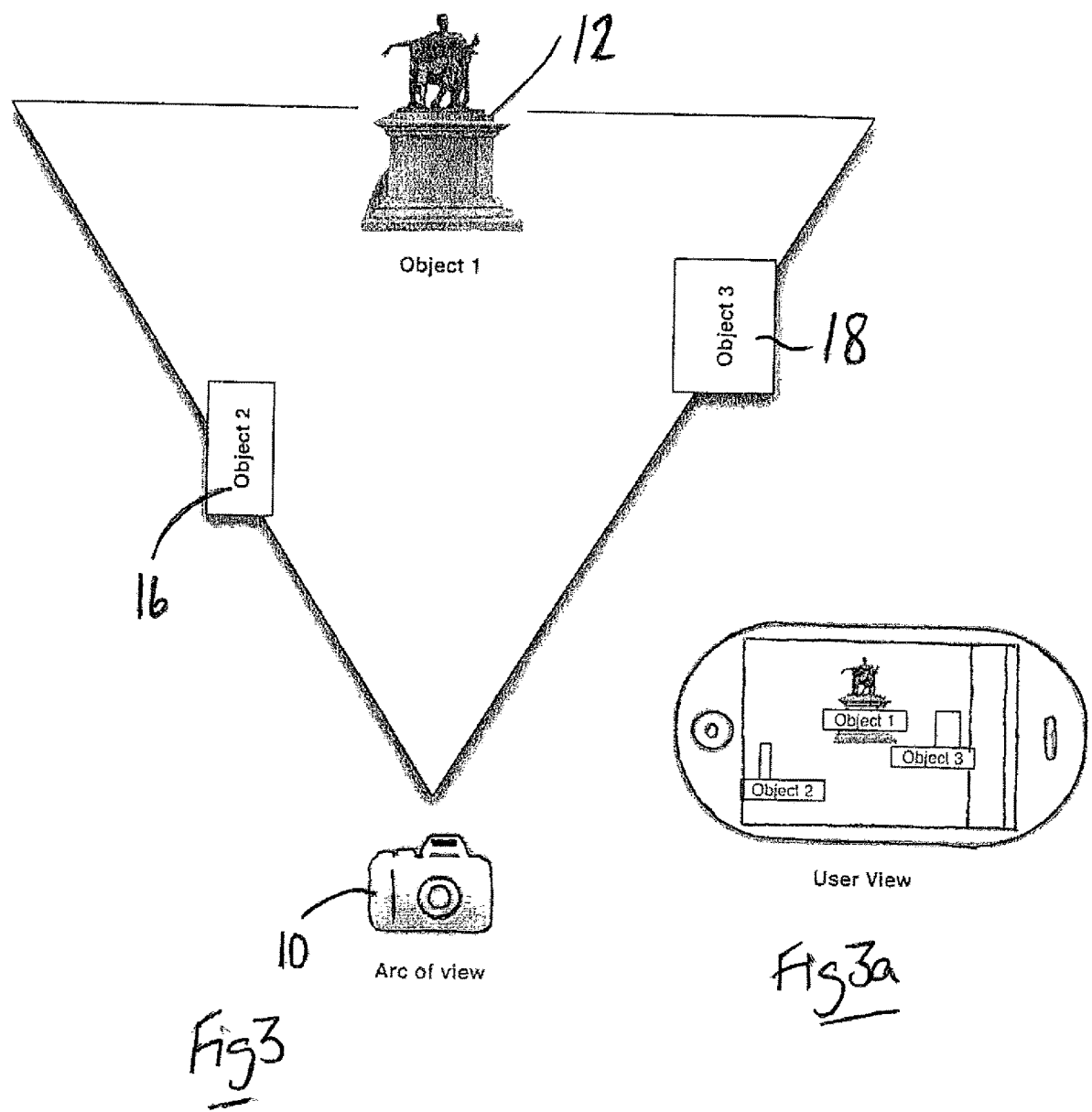
FIGS. 3 and 3a show schematically an alternative first step in a context recognition process, in which there are multiple visible objects in the camera live view.

FIG. 3 shows schematically the scenario in which multiple objects are detected by the device. In this case the object 12 is detected and so are two further objects 16 and 18. The device displays all three objects together with respective virtual buttons superimposed thereon so that the user may select the object of interest by touching the appropriate button on the screen, as is shown in FIG. 3a.

Figure 4:
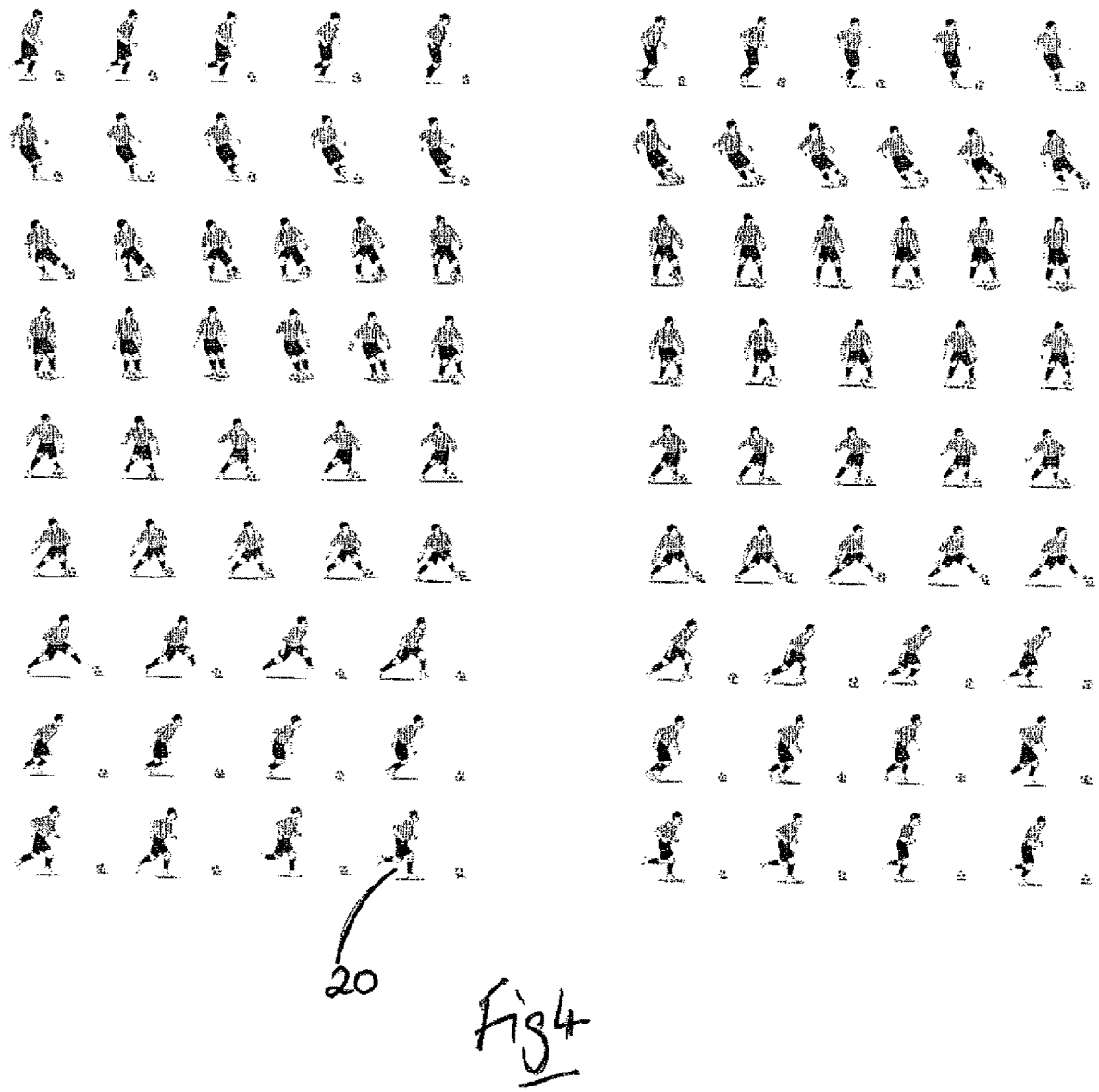
FIG. 4 shows schematically an animation technique for use with an embodiment of the present invention.

FIG. 4 shows schematically one method for animating a virtual image. It uses a long established technique of cutting a moving image into a succession of still frames 20 on a green screen background (not shown). The device then plays back the sequence of still images, removing the green screen background automatically as necessary. As the individual images are replaced at a rate greater than six frames per second, the human eye interprets them as a continuous moving image. A soundtrack, optionally of MP3 format, is played in synchronism with the animation to reinforce the illusion of continuous video footage. In this example the animated figure is a Roman soldier, whose commentary and actions are relevant to the attraction being viewed through the camera display.

Figure 5:
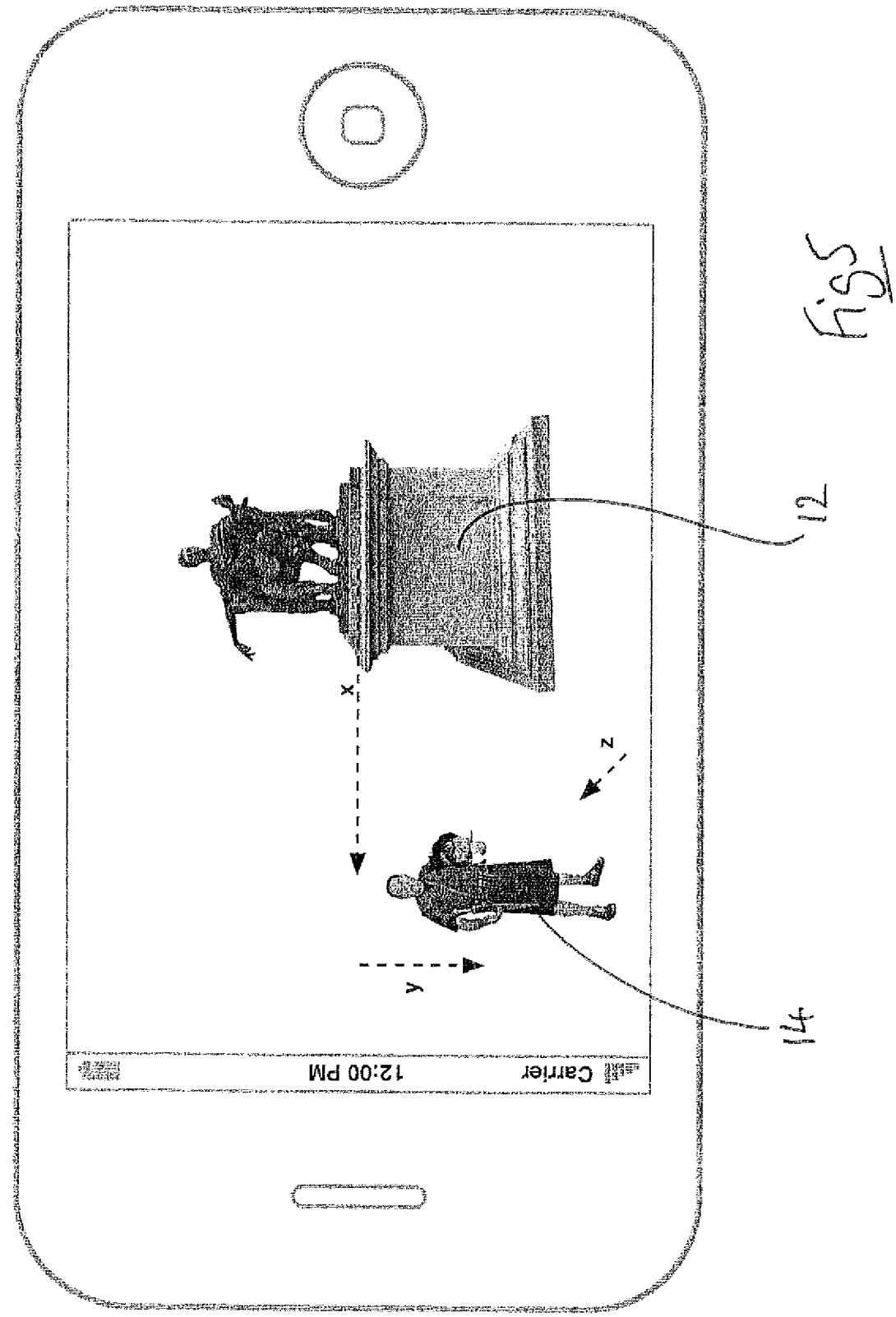
FIG. 5 shows schematically a positioning process according to an embodiment of the present invention.

FIG. 5 shows schematically a technique for positioning the image 14 with respect to the object 12. During creation of a particular app, when the particular scene is first investigated, a creative director will choose an optimum placement for the virtual image, based upon a number of factors, both artistic and practical. Once the optimum position is chosen the system uses trigonometry to compute the position of the image at real world spatial coordinates x, y and z with respect to the object 12. An alternative is to decide upon a zero point within the object and to position the image using absolute x, y and/or z coordinates from the zero point.

Figure 6:
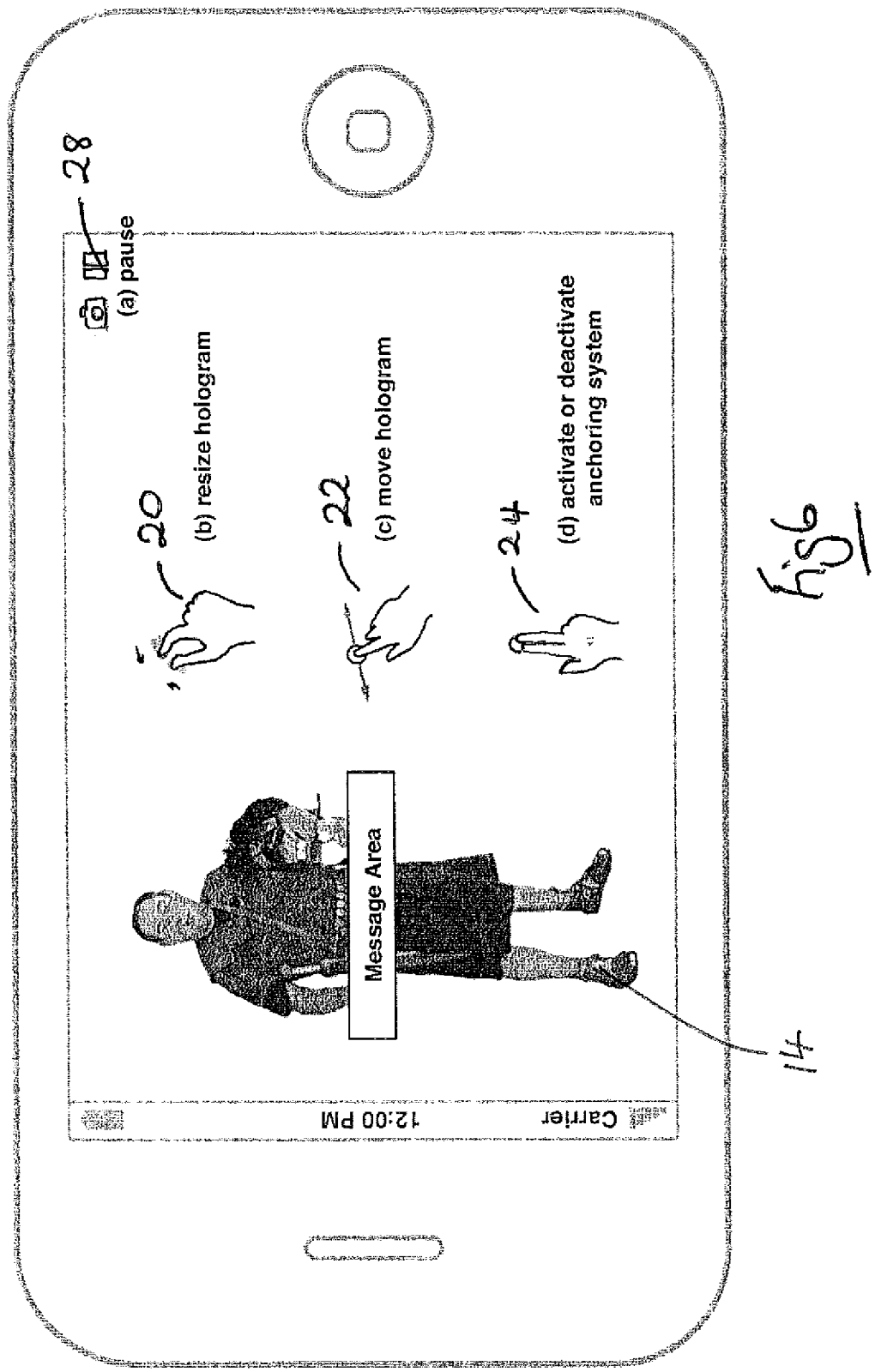
FIG. 6 shows schematically optional user controls for a virtual image, according to an embodiment of the present invention.

FIG. 6 shows schematically how the user can re-size or reposition the image with respect to the object. The image can be resized using a finger and thumb pinching and spreading technique 22 whilst touching the screen. The image can be moved using a drag and drop technique 24, and an anchoring system (described below) can also be activated or deactivated by a double finger double tap technique 26. In a PLAY mode, a virtual PAUSE button 28 is also provided, which converts to a virtual PLAY button (not shown) in PAUSE mode.

In order to maintain the illusion that the figure is actually present beside the attraction, it is necessary that the position of the figure—ie the image 14—be spatially anchored with respect to the object 12. This is because if the user moves whilst viewing the object and the virtual image through the camera, an image that is fixed with respect to the camera screen would quickly fail to maintain the illusion of reality.

Figure 7:
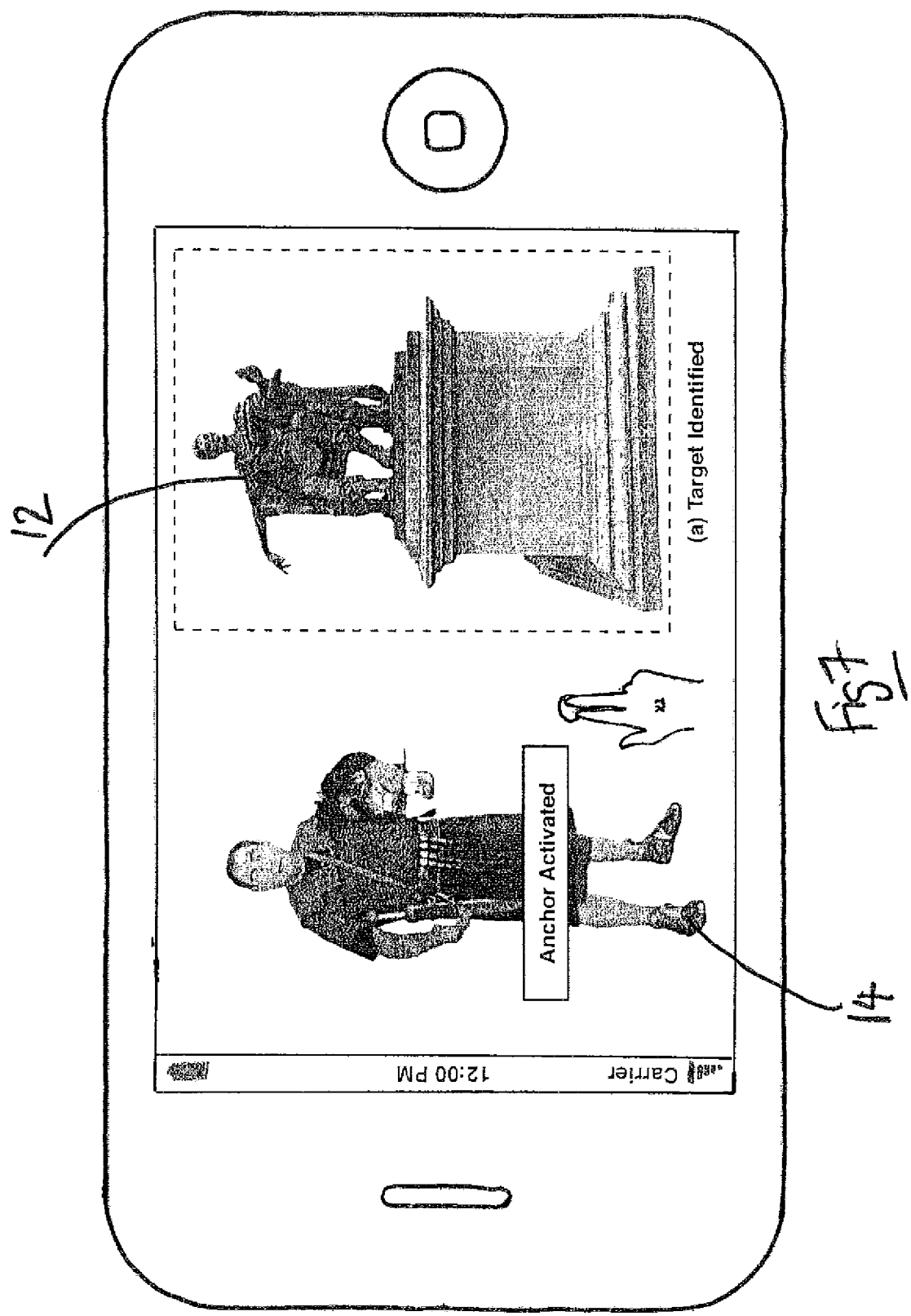
FIG. 7 shows a first step in an anchoring process for the image of FIG. 6.

FIG. 7 shows schematically an anchoring system according to one embodiment of the present invention. The system uses a pre-defined algorithm to seek objects that are either prominent or else have a definitive shape within the camera view. Once several objects have been located the system uses advanced trigonometric techniques to evaluate the scene displayed in the camera view and to allocate proportion data to the virtual image. The system then locks the image in x, y and z coordinates with respect to its real world context.

Figure 8:
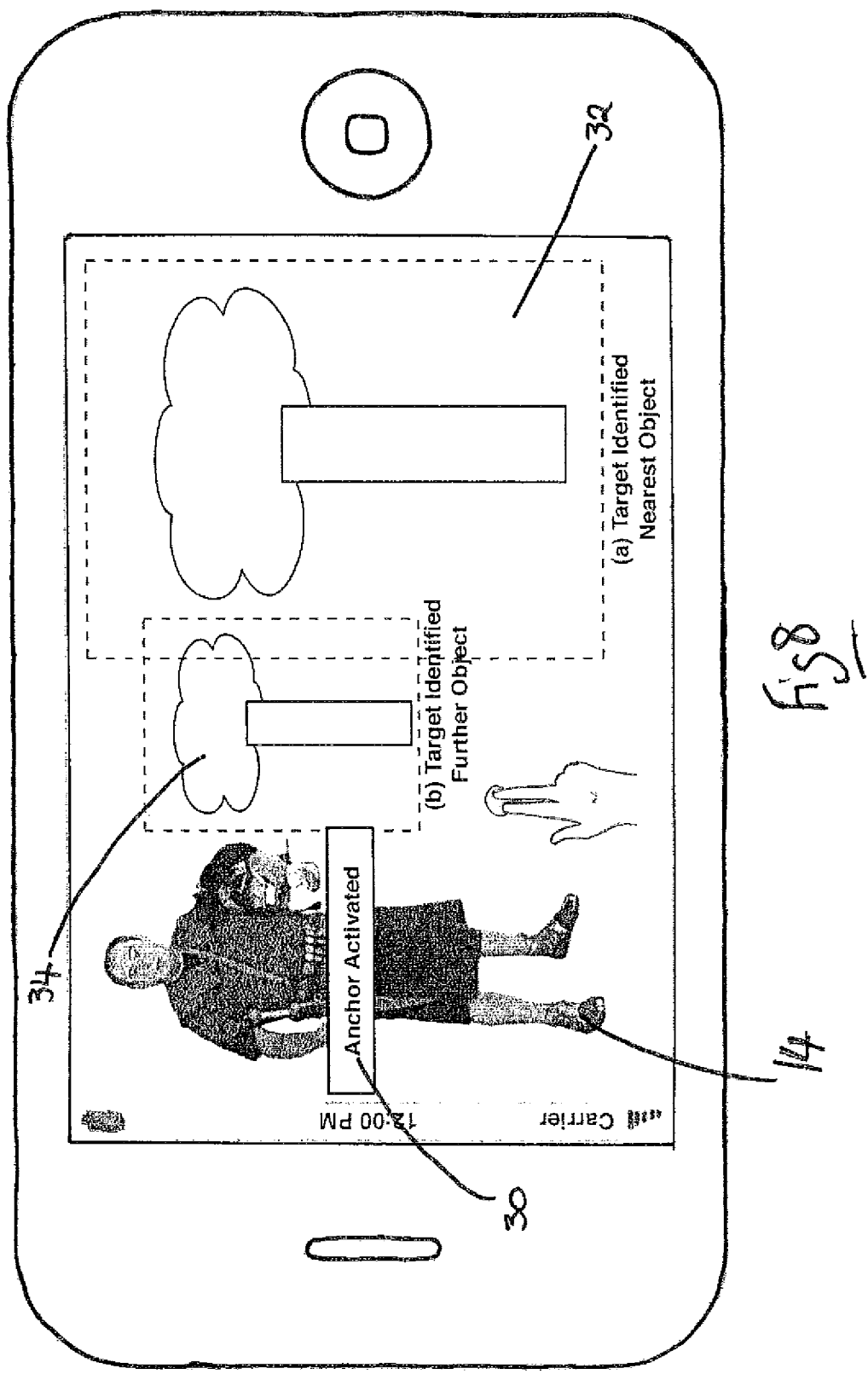
FIG. 8 shows a further step in the anchoring process of FIG. 7.

FIG. 8 shows schematically in more detail the anchoring system according to the above-described embodiment of the present invention. Firstly, a label 30 indicates that the anchor system has been activated. Then the device dynamically detects the nearest object 32 in the camera view. In this case, the method used is one in which an algorithm seeks to recognise objects by detecting a pattern, rather than using pre-processed matrix points (as per the example of FIG. 1). This allows the algorithm to look for real world objects to which the performance—ie the virtual image—can be anchored. For example, the algorithm could recognise the four edges of a snooker table. This allows an improved anchoring technique as recognition rules are created that allow the application of higher or lower thresholds based upon a particular object, or type of object. One suitable previously considered algorithm is known as FAST (Features from Accelerated Segment Test).

A second object 34 is then detected by the device, to provide depth information. The image is then anchored to the first object—ie the position of the image in x, y and z coordinates with respect to the location of the first object 32 is determined. The device then checks regularly to determine whether the object pattern—ie of objects 32 and 34—has changed, which would occur if the user holding the device had moved. If the device determines that there has been movement the device re-scans the field of view and determines the closest match to the initial pattern of objects 32 and 34 to ensure that the position of the virtual image 14 is still true.

The above-described approach allows a user to lock the anchor to a known object within the display, in almost any location, efficiently and invisibly. If there is no specific object from which to take a reference—such as an open field, for example, then the system reverts firstly to a pre-loaded recognition library and then if no view is recognised a digital compass and GPS reference are used to fix the location of the image in real space.

Figure 9:
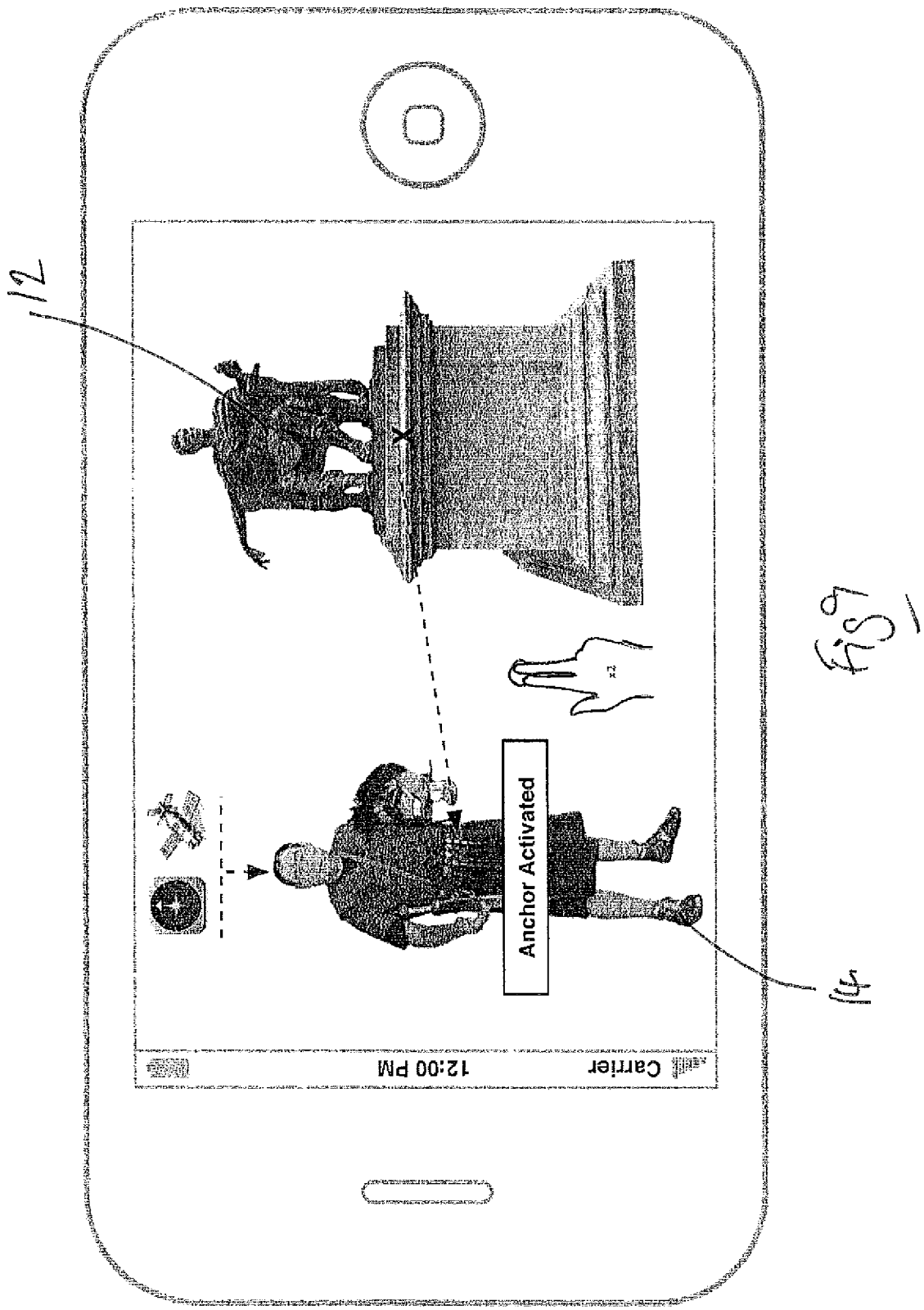
FIG. 9 shows schematically an alternative anchoring process according to an embodiment of the present invention.

The use of GPS and digital compass bearing by the anchoring system is depicted schematically in FIG. 9. This configuration builds a basic real world map by using GPS coordinates alongside compass bearings. The GPS coordinates are used to lock a known longitude and latitude configuration, whilst the bearings are used to detect 360 degree circular movement by the user. If the system detects such a movement then the movie is returned to its original locked position. The animation returns using algorithms that provide a smooth and quick return to the coordinates acknowledging dampening and speed of return based on distance moved.

Figure 10:
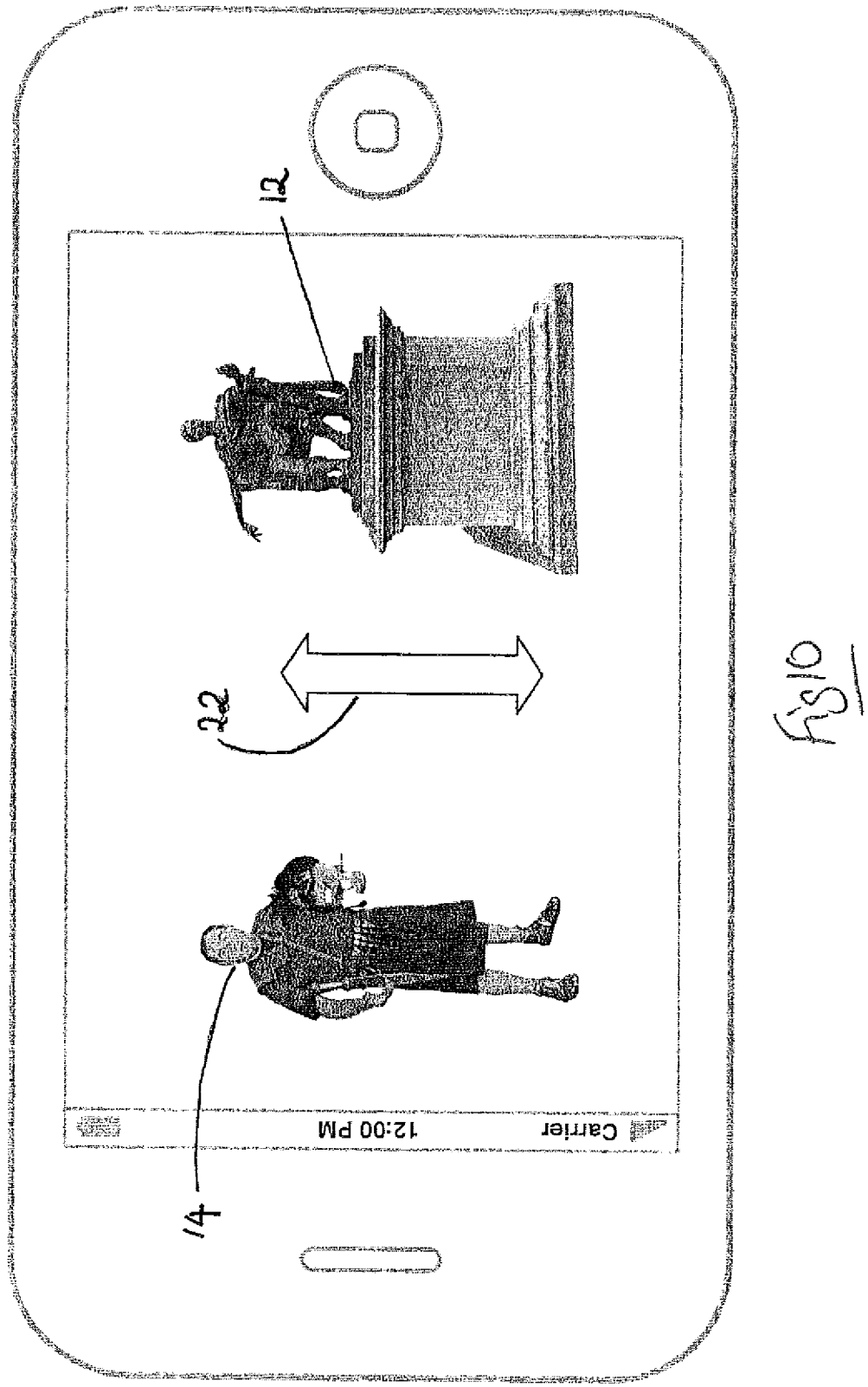
FIG. 10 shows schematically an automatic re-sizing process for a virtual image, in accordance with an embodiment of the present invention.

The apparent size of the image with respect to objects in the camera view is also important to maintain the illusion of reality. FIG. 10 shows an automatic sizing operation in which the image 14 is adjusted with respect to the object 12 when a user, viewing the object through the camera device, moves either closer to or further away from the object.

Sophisticated algorithms are employed by the device to adjust the size of the image smoothly as the user moves towards or away from the object 12. The autofocus function of the camera lens may be employed to provide data concerning a change in the distance from the object. If the device does not possess an autofocus function then the distance to the recognised object can be calculated using stored data about its origin. Both techniques can be used, where available, to provide a more accurate reading.

Alternatively, the user can manually re-size the image 14 using the pinch technique 22 described earlier.

Figure 11:
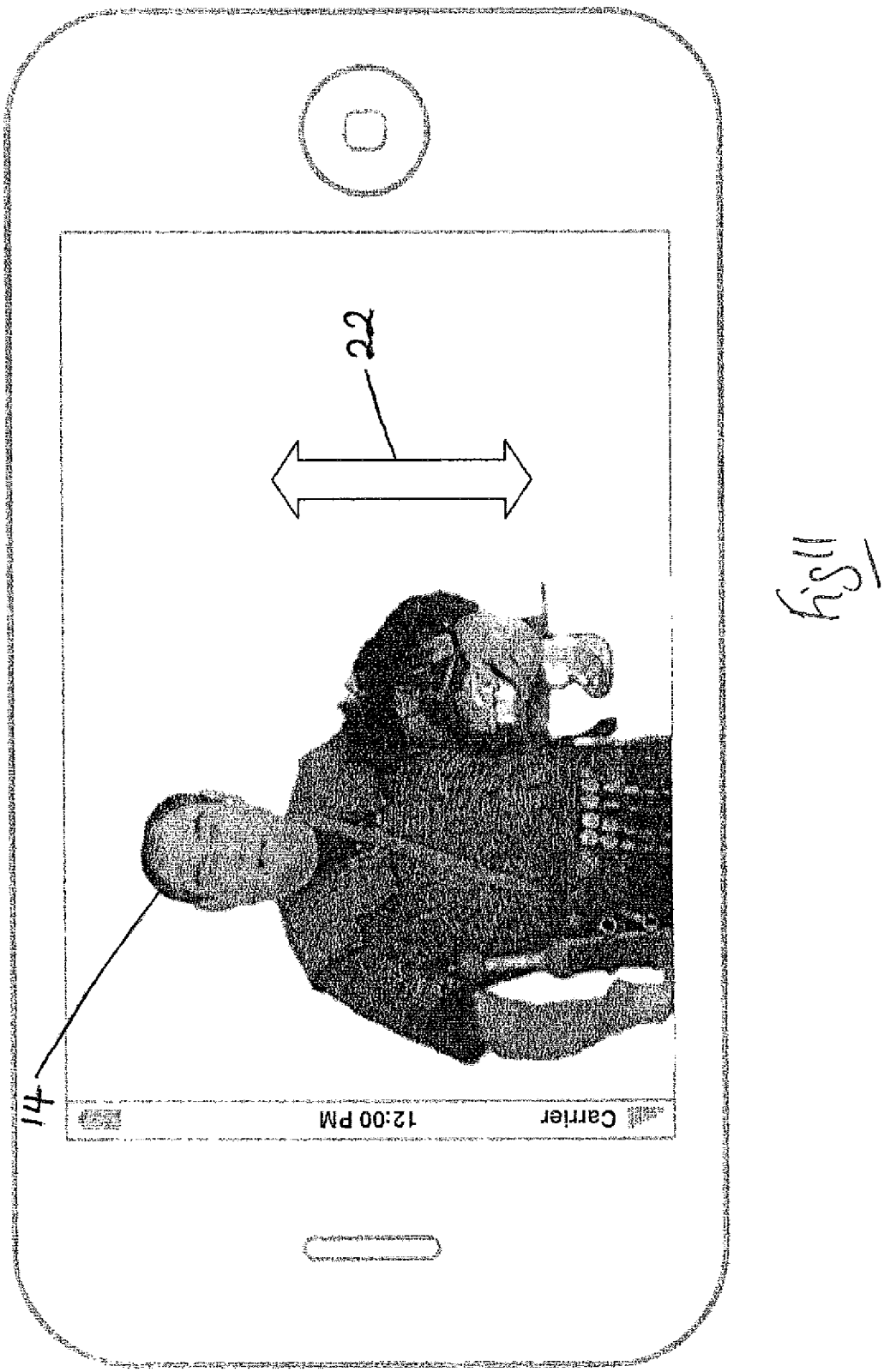
FIG. 11 shows schematically an automatic re-sizing process for a virtual image in an alternative scenario.
Figure 19:
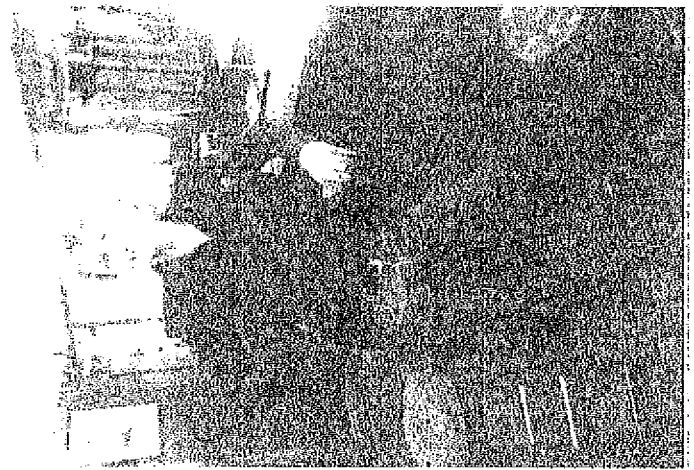
Figure 22:
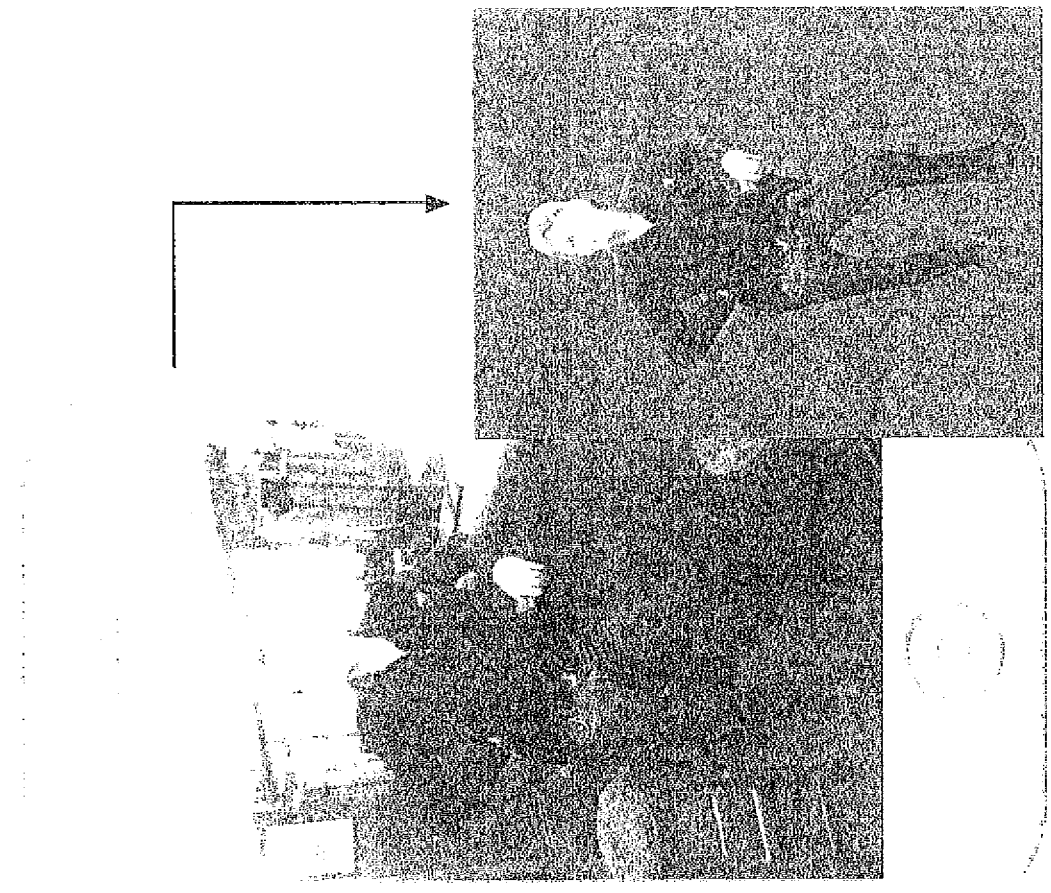

If a relatively cramped location is detected by the system, such as an indoor location, or a medieval street scene for example, the device automatically re-sizes the image to a larger size so as to maintain realism. FIG. 11 depicts the enlarged image 14 in such a case.

The system also allows the capture of still or video images bearing both the real view and the virtual image. FIGS. 12-15 show schematically a process for taking a photograph with the virtual image 14 included. In FIG. 12 a real person 36 walks into a scene in which the virtual image 14 of the figure is already positioned. In FIG. 13 the photograph is taken and stored and the coordinates of the virtual image are recorded. In FIG. 14 the system post-processes the image 14 and the perspective is auto-detected. The composite image is then re-saved. At FIG. 15 the user is invited to share the stored composite image via virtual buttons 38 accessing several common media. A short video sequence can be recorded and shared in a similar way.

FIG. 16 shows schematically an example of a process according to the embodiment described above.

At step 100 the process begins. At step 102 object recognition rules are read from a database. At step 104 the device reads the view and at step 106 it checks for a recognisable pattern. The device loops until a pattern is detected. Once a pattern is detected an appropriate moving image is selected from a library at step 108. At step 110 the image is positioned and play begins. Step 112 awaits a user input. Options to exit 114, re-size 116, anchor 118 or reposition 120 are available. If the user selects to exit the app at step 114 the app is stopped at step 122. Otherwise the video image continues to play at step 124.

FIG. 17 shows an alternative embodiment in which an object recognition database 40 is split into several smaller databases 42, 44, 46, 48 according to user location. Three or more angles of an object are checked 50 and once the object has been detected the virtual image is launched 52.

The above examples describe using touch controls, which may be different to the ones described. However, where the apparatus supports it, non-contact gestures may be employed to control the device. Similarly, where the apparatus supports it, voice commands may be used to control the apparatus.

The term "context", as used herein, may in most cases be regarded as a camera view. Likewise, the term "contextual information" may in most cases be regarded as "camera view information".

The contextual information may be derived from a "real world" image, as viewed through the camera of the device, or may be derived from a two-dimensional image, such as a printed page, photograph or electronically displayed image. This allows the techniques described above to be used to enhance a user experience in a wide variety of circumstances, such as viewing a printed publication or advertisement. In one embodiment (not shown), the virtual image can be made to appear to rise or "pop" up from a such a two dimensional context.

Image processing techniques may be employed to create virtual shadows for the virtual image, so as to enhance the perception that the virtual image is a real one. Similarly, image processing techniques may be employed to balance the apparent brightness of the virtual image relative to the real world context being viewed through the device.

Although the examples described above are of a two-dimensional viewing experience, the techniques described herein may also be applied to an apparent three-dimensional viewing experience where the apparatus supports this, such as in 3-D video playback formats.

In the above description, the term "virtual image" is intended to refer to a previously captured or separately acquired image—which is preferably a moving image—that is displayed on a display of the device whilst the user views the real, or current, image or images being captured by the camera of the device. The virtual image is itself a real one, from a different reality, that is effectively cut out from that other reality and transplanted into another one—the one that the viewer sees in the display of his device.

Turning to FIGS. 18-23, these show a method of recording a basic image of a subject and a background, extracting the image of the subject from the background and sending it to a remote device.

The method comprises three basic steps, as outlined in FIG. 18:
1. Shoot a video clip.
2. Select and send.
3. Appear in the recipient's environment.

In more detail (FIG. 19):

The user takes a video sequence of a subject. The video sequence is monitored for optimum duration.

A premium version of the invention may permit a longer video sequence.

The user will decide to keep or delete the video sequence. If accepted, the methodology moves forward.

Edit the First Frame (FIG. 20):

Once the user is happy with the video sequence they are presented with the first frame.

This first frame will be used to identify the subject.

Once the subject has been identified it will be tracked through the system frame-to-frame.

The user selects the subject by either of the following:

The whole image will be grayscale and the user will use a finger to highlight the object by replacing the missing colour values. This method forms boundary edges.

Or

The user will select round the object forming a 'halo' to define the boundary edges.

For immediate purpose the first of the above technique will be explained.

Select the Object (FIG. 21):

The user uses a finger to select the subject.

The app/method will allow for different size area selectors, as well as a zoom feature for minute accuracy.

The app/method will also allow for a solid colour overlay to show any areas of the subject that have been missed by the user.

Once the user is happy with the subject selected, they will then pass the object to the next stage of the methodology.

Realise the Background (FIG. 22):

The subject selected, now allows for inverse recognition of the background.

The background will be selected and deleted from the subject.

The background will be filled with a solid defined colour, or shaded or otherwise differentiated from the subject.

Note that the distinction between the subject and the background need not be a simplistic, binary background/subject label. Instead each pixel could be labelled with a probability that it belongs in the subject, and the determination could be made according to the probability value.

Track the Object (FIG. 23):

The initial frame background has now been deleted.

The system will now analyse each frame:
1. Follow the motion of the subject.
2. Delete the background information.
3. Replace background with solid colour or otherwise contrasting indicator.

Once each frame has been rendered they can be 'stitched' back together into a video sequence, or returned as a set of frames.

This may be completed on the mobile device, or may be completed off-device on an external computing system where it would be returned to the user's device once ready.

The user will decide whether the image is as they require. If they wish to keep it will be stored both on the device alongside a version within an off-site hub/database.

This rendered image can then be sent to any other user who has the app technology installed on the device.

There are several methods by which the subject image could be extracted from the basic image including the background. The actual method used may comprise one or a combination of the following methods.

Method 1. Simple Background.

In this method, a user/subject stands in front of a solid colour wall, with enough space in front of the wall to avoid shadows. The user needs to wear contrasting colour clothes that stand out from the background with soft lighting.

Extraction of background is then based on the colour at the edge of the image (top/sides).

If the converted video is to be played back on a mobile device the background alpha can be faded so that there are no sharp edges at the background/foreground image border. In this case the alpha will not be encoded as a simple green screen but will use an extra scale image in each frame of the video to encode the alpha channel.

This extraction method is relatively straightforward to implement. However, to get the best result will need some experimentation and could have some user input to guide the finished result. For example drawing a crude outline of the desired part of a video frame to include/exclude would give a greater range of colours that would be defined as background.

The conversion time could be fast, at or near real time.

Method 2, Background Static.

Background subtraction is a major pre-processing step in many vision-based applications. OpenCV has implemented three such algorithms. The basic idea is to assume the background is static and identify changes in the image. These methods will also extract shadows as foreground and may not detect large solid block of colour as foreground.

Camera movement would be a problem as this would appear as new foreground at the edge of images. Camera movement can be restricted by the users and video stabilisation could be used where present in the mobile device.

It is also possible to add some user input to the background detection to identify regions that are known background/foreground.

This method can be combined with Method 1 to give a better result than Method 1 alone as it would allow for backgrounds that were more varied than a blank wall.

This method may require a processing stage after the video was taken.

Method 3 (Interactive with User Input—Using the Example of OpenCV)

Interactive Foreground Extraction using GrabCut Algorithm (OpenCV)

OpenCV has an algorithm for extracting the foreground subject that gives very good results, the GrabCut algorithm. GrabCut requires the user to provide information at the region of interest and/or provide hints to the probable foreground/background. In the first pass the extraction is done and results presented. The user must then mark the areas that are wanted but have been removed or been removed but are wanted, as probable foreground/background.

For video the user defined information can be carried forward to the next frame. If required the region of interest and probable foreground/background could be updated. An intelligent implementation would attempt to follow the probable foreground/background to automate the process as far as possible.

Changes to the original algorithm would allow the background/foreground alpha to be based on the probability of each allowing a soft edge to the selection.

This method may not be real time and may require a processing stage after the video was taken, but can achieve high quality results.

A fourth method—based around a specific type of subject e.g. a face—will be described later.

Implementation

Turning to FIGS. 24-30, these show schematically a chat system or messaging platform according to an embodiment of the present invention, in which a mobile phone is the example of hand held device on which the invention is carried out.

Figure 24:
Figure 25:
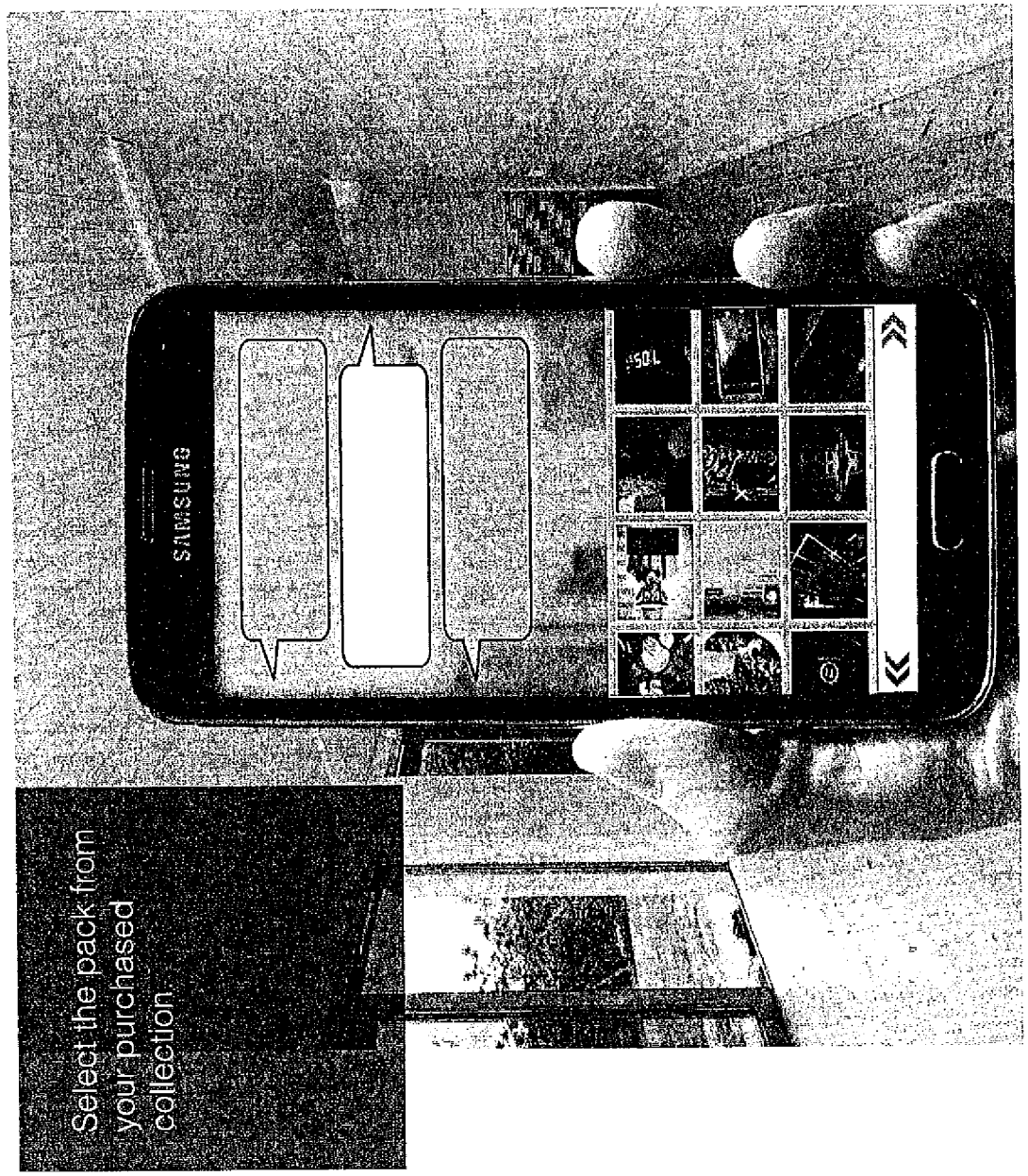

Firstly the phone is tilted to near vertical and the camera opens with a frosted effect (FIG. 24).

The user types messages or presses an app button to open image packs. The images may be pre-recorded images of the user, for example, or may comprise images downloaded from a commercial site.

The next step (FIG. 25) is to select the pack from a collection.

Figure 26:
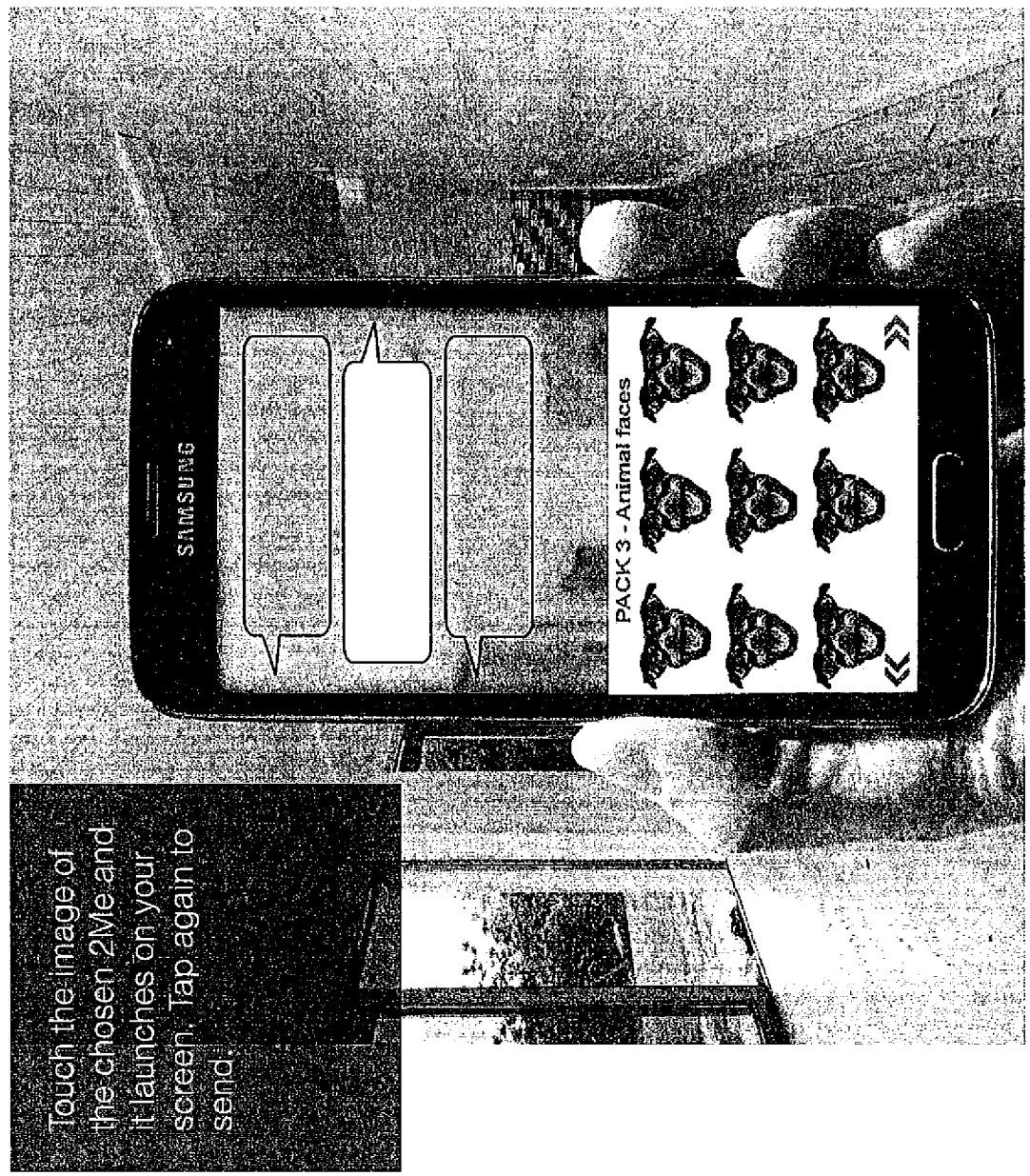

The user then touches the chosen image and it launches on the screen (FIG. 26). The image is then tapped again to send.

Figure 27:
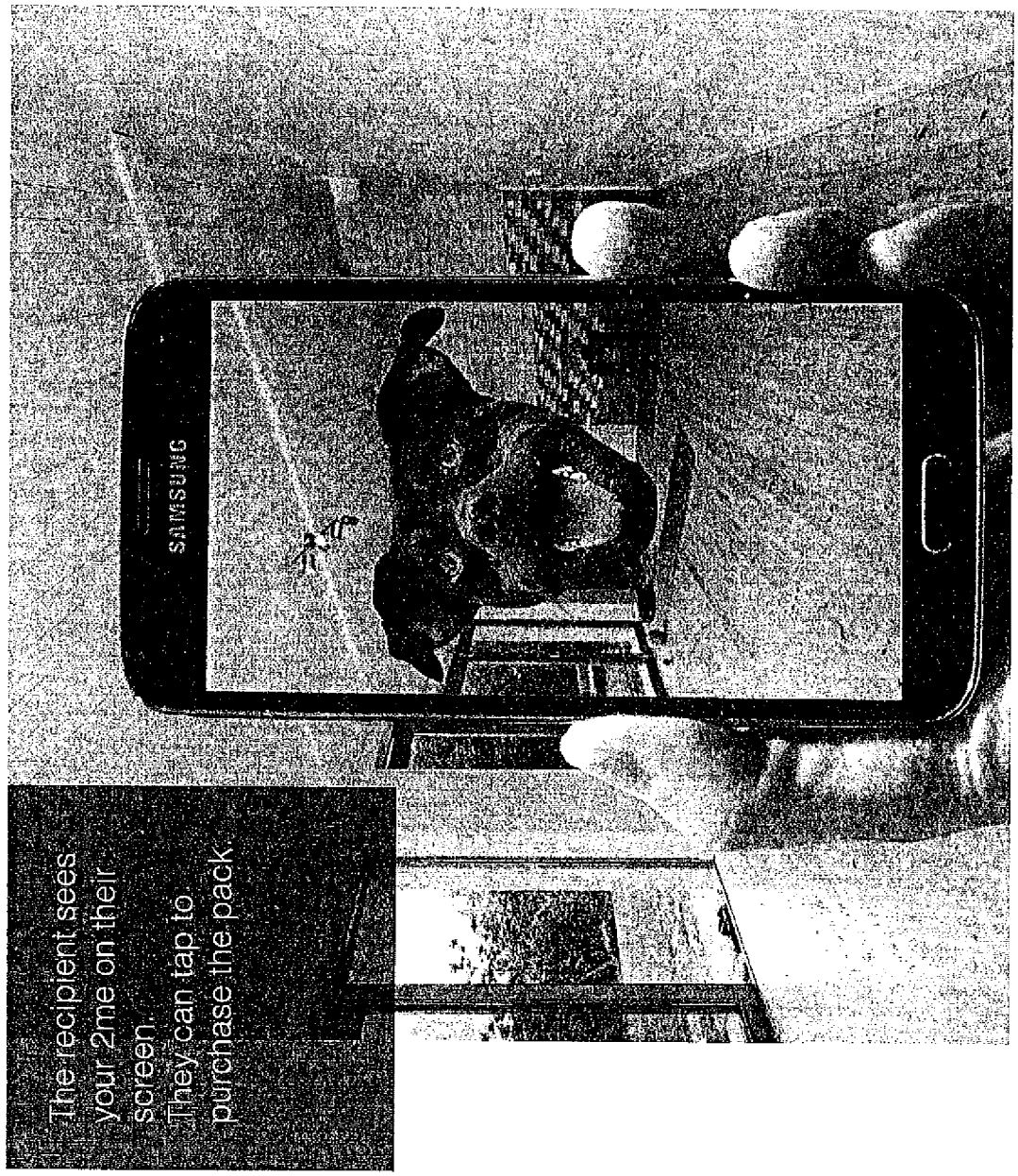

FIG. 27 shows the next stage. The recipient sees the sent image on their screen. They can tap to obtain/view the pack.

Figure 28:
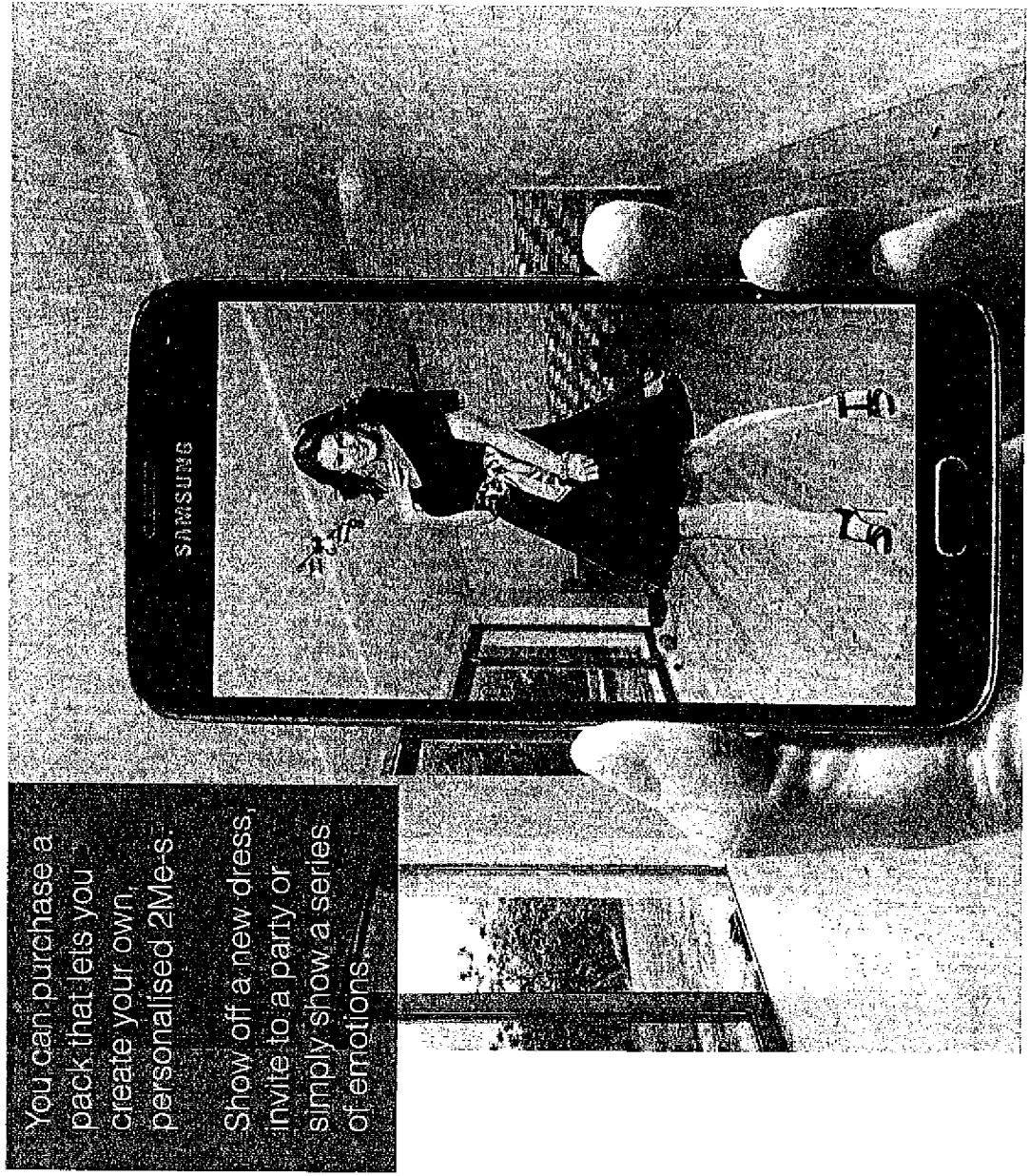
Figure 29:

The user is able to create his/her own personalised images FIG. 28). For example the user is able to show off a new dress, invite someone to a party or simply show a series of emotions.

Figure 30:
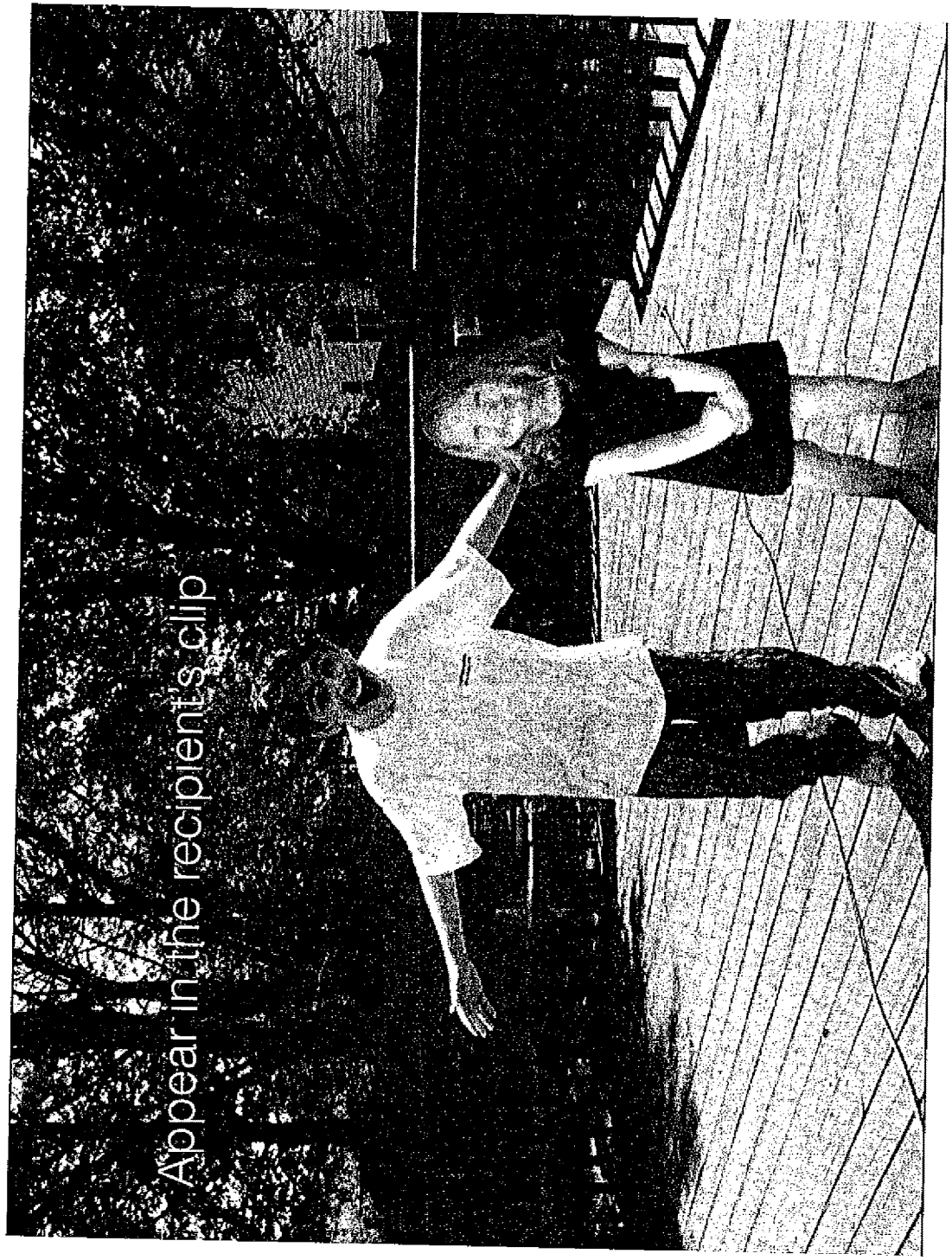

A video clip can be made (FIG. 29) which can then be selected and sent, as described above, so that it appears in a recipient's environment (FIG. 30).

FIG. 31 shows the sequence of steps schematically. At Step A, a person, in this case a child, is recorded as a moving image. The background to the image is then separated and discarded before the selected image is sent to a recipient who can be anywhere in the world. Image B depicts a real scene at a remote location. In this case the scene is of a child's party. Having received the moving image of the girl, the recipient can then play back the received image superimposed onto the camera view displayed on the recipient's screen—as depicted at C. A video can then be made of the virtual encounter whereby a person at a remote location can appear to be present in the recipient's world, with the virtual image appearing to be anchored in the recipient's environment, so as to create the illusion that the subject depicted in the image is actually present in the recipients space.

Figure 32:
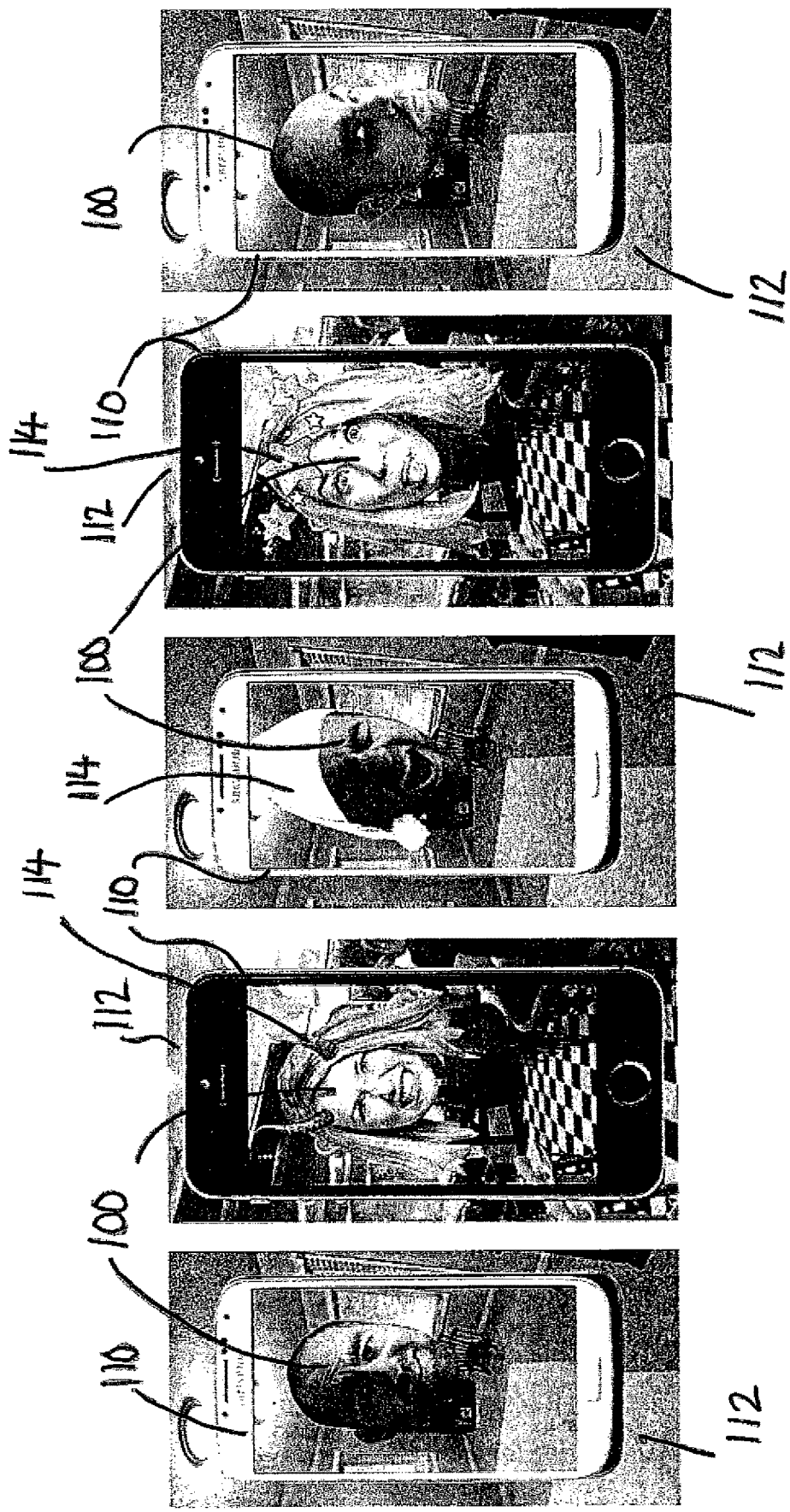

Turning to FIG. 32, this shows various images 100 on displays 110 as received by recipients. The method and apparatus described above allow something between a text message exchange and a video call. The message sender uses either the front camera or the rear camera in the smart phone to capture a short video of them speaking and the app software cuts out the sender's head 100 before transmitting the video clip to appear on the recipient's screen 110. The cut-out head can appear on a recipient's desktop, conveniently as part of a messaging screen. Alternatively the recipient, who also has the app, can open the rear-facing camera of their phone so that the head appears to float in their environment 112 as it plays the short performance. The process is reversed to make a reply.

FIG. 33 shows the process schematically. At A the sending person using the app to record a moving image of their own head—ie a video— which is separated from the background by the app. In a preferred arrangement the background can be automatically discarded. However the person who makes the recording could instead manually remove the background as an alternative, or additional, feature. The image is then sent to a recipient who, at B, sees the head speak to them either on their desktop or in the camera view of the smart phone/tablet if they so choose.

Such a message according to the embodiment is different to a text message because:

- It is faster to use than tapping out character keys
- It conveys emotion as the facial expression can be seen and tone of voice heard, rather than just words on a screen
- It can be both funny and personal
- The users can take/store photos of the head, if the sender grants permission.

The message is different to a video call because:

- It uses very small amounts of the mobile user's data allowance.
- It delivers discreet, individual 'sound-bites' of message
- It has the option to add on augmented reality images, locked to the head, such as those shown at 114, including horns, a hat and stars, in the examples shown.
- It can easily be kept for future reference With embodiments of the present invention as described above, images, including moving or video images, can be sent by a sender to a receiver to appear in the receiver's environment as a virtual image when viewed through a display of the receiver's device, against a receiver's background being imaged by a camera of the receiver's device. The image can be locked or anchored with respect to the background being viewed, so as to give the appearance of reality.

The images can comprise images created by the sender and extracted as a subject from a sender's background, to be viewed against a receiver's background. Furthermore, the images can be sent from user to user over a convenient messaging network.

It should be noted that with the methods described above, the sender is able to send an image of himself without revealing his background/whereabouts to the recipient.

The foreground, or subject, image can be sent without the background, and not merely with the background being made invisible (e.g. alpha value zeroed) but still remaining part of the image.

Also, the examples above have the recipient viewing the received image through the camera view of the recipient's device, this need not be the case. For example, as an alternative the recipient may view the image floating on his desktop or above an app skin on his device. This may be more convenient to the user, depending on his location when viewing.

Where the image to be sent comprises e.g. just a head of the sender, this represents a relatively small amount of data and so the invention can provide a systemised approach to sending video images without the need for the usual steps of recording a video clip, saving, editing and then sending it to a recipient.

FIG. 34 shows a sequence of steps (from left to right) in a messaging process, in which a combination of the above-mentioned options may be brought into the user experience. A hand held device 200 is used to convey messages in the form of speech bubbles between correspondent A and correspondent B according to a known presentation. However, correspondent A also chooses to send to correspondent B a moving image 210 of her own face, delivering a message.

In this example the conversation raises the subject of a performance by a musical artiste. One of the correspondents A and B can choose to send to the other an image 220 of the artiste's head, which then appears on the desktop. The moving image can also speak a short introductory message. This is available via the messaging app being run by the correspondents on their respective devices. If the head 220 is tapped with a finger 230, a fuller image 240 of the performer appears on top of the graphical features seen on the desktop to deliver a song, or other performance.

If the full image 240 is tapped by the finger 230 again it opens the camera (not shown) of the device so that a complete image 250 of the performer is integrated with a background image 260 of user's environment, in scale and anchored to a location within the background image so that it remains stationary with respect to the background if the camera move left/right or in/out to give the illusion of reality.

Thus, using the various aspects and/or embodiments of the invention described above, a user can switch between a cut-out part, such as a head, of a selected moving image, a fuller image and a complete augmented reality experience. Moreover this facility can be employed in a messaging system, between two or more correspondents.

The above described techniques can be used in other platforms, such as direct or peer-to-peer messaging platforms, in which a network need not be required. They can also be used for business, such as in business conferences, as well as for purely social interaction.

The above-described embodiments may also be used as part of a video voicemail system.

Furthermore, whilst in the above-described examples the users communicate using hand held devices such as mobile phones and/or tablet computers, the devices used need not be of the same type for both sender and receiver or for both/all correspondents in a messaging system. The type of device used may be any of a wide variety that has—or can connect to—a display. Gaming consoles or other gaming devices are examples of apparatus that may be used with one or more aspects of the present invention.

The process of extracting a subject from an image including an unwanted background is sometimes referred to as "segmentation". The following description is of techniques for performing segmentation when the subject belongs to a known class of objects.

Method 4: Face Segmentation

When the source video comprises an object taken from a known object class, then object-specific methods for segmentation can be employed. In the following example human faces are to be segmented where the video is a spoken segment captured with the front facing camera (i.e. a "video selfie"). The same approach could be taken with any object class for which class-specific feature detectors can be built.

Figure 35:
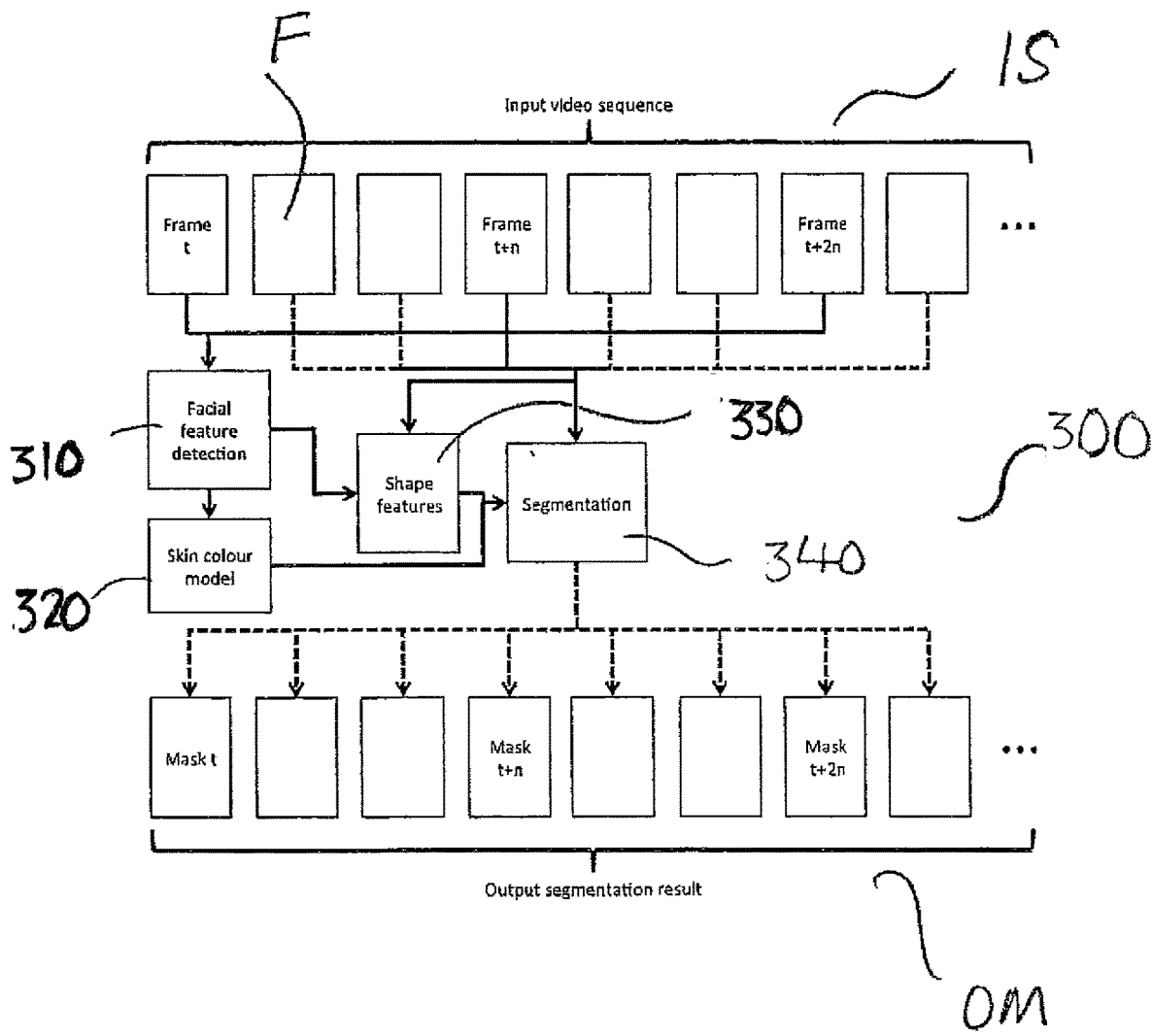
FIG. 35 shows schematically some of the processes used in extraction of a subject image from a basic image including the subject and a background.

The face-specific pipeline comprises a number of process steps. The relationship between these steps is shown generally at 300 in the flowchart in FIG. 35. In order to improve the computational efficiency of the process, some of these steps need not be applied to every frame F (instead they are applied to every nth frame) of the input video sequence IS. A detailed description of each step is as follows:

In Process 310 facial feature detection is performed. The approximate location of the face and its internal features can be located using a feature detector trained to locate face features. Haar-like features are digital image features used in object recognition. For example, a cascade of Haar-like features can be used to compute a bounding box around the face. Then, within the face region the same strategy can be used to locate features such as the eye centres, nose tip and mouth centre.

In Process 320 skin colour modelling is performed. A parametric model is used to represent the range of likely skin colours for the face being analysed. The parameters are updated every nth frame in order to account for changing appearance due to pose and illumination changes. In the simplest implementation, the parameters can be simply the colour value obtained at locations fixed relative to the face features along with a threshold parameter. Observed colours within the threshold distance of the sampled colours are considered skin like.

A more complex approach is to fit a statistical model to a sample of skin pixels. For example, using the face feature locations, a set of pixels are selected that are likely to be within the face. After removing outliers, a normal distribution is fitted by computing the mean and variance of the sample. The probability of any colour lying within the skin colour distribution can then be evaluated.

In order to reduce the influence of colour variations caused by lighting effects, the model can be constructed in a colour space such as HSV or LCrCb. Using the H channel or the Cr and Cb channels, the model captures the underlying colour of the skin as opposed to its brightness. At Process 330 shape features are determined. The skin colour model provides per-pixel classifications. Taken alone, these provide a noisy segmentation that is likely to include background regions or miss regions in the face. There are a number of shape features that can be used in combination with the skin colour classification. In the simplest implementation, a face template such as an oval is transformed according to the facial feature locations and only pixels within the template are considered. A slightly more sophisticated approach uses distance to features as a measure of face likelihood with larger distances being less likely to be part of the face (and hence requiring more confidence in the colour classification).

A more complex approach also considers edge features within the image. For example, an Active Shape Model could be fitted to the feature locations and edge features within the image. Alternatively, superpixels can be computed for the image. Superpixel boundaries naturally align with edges in the image. Hence, by performing classifications on each super-pixel as opposed to each pixel, we incorporate edge information into the classification. Moreover, since skin colour and shape classifiers can be aggregated within a superpixel, we improve robustness.

At process 340 Segmentation takes place. Finally, the output segmentation mask OM is computed. This labels each pixel with either a binary face/background label or an alpha mask encoding confidence that the pixel belongs to the face. The labelling combines the result of the skin colour classification and the shape features. In the implementation using superpixels, the labelling is done per-superpixel. This is done by summing the per-pixel labels within a superpixel and testing whether the sum is above a threshold.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A method of providing an augmented reality image from a sender device to a recipient device including a recipient display, the method comprising:
   recording a video of a live camera view using a camera in the sender device, the video of the live camera view including a person and a first background;
   extracting a moving image of at least a face of the person from the video of the live camera view at the sender device to create a video sequence, the extracted moving image of at least the face of the person excluding images of the first background from the live camera view;
   sending the video sequence of the extracted moving image of at least the face of the person to the recipient device without the first background;
   superimposing the video sequence of the extracted moving image of at least the face of the person on a second background of the recipient display, wherein the second background is a desktop or an app skin presented in the recipient display; and
   anchoring and scaling the video sequence of the extracted moving image of at least the face of the person with respect to the desktop or the app skin presented in the recipient display.

2. The method according to claim 1, wherein the extracted moving image of at least the face of the person comprises a head and/or face of a sender of the image.

3. The method according to claim 1, wherein the video sequence of the extracted moving image of at least the face of the person includes one or more graphical elements.

4. The method according to claim 3, wherein the one or more graphical elements is anchored to the extracted moving image of at least the face of the person.

5. The method according to claim 1, wherein the moving image of at least the face of the person is extracted from the video of the live camera view using subject feature detection, subject colour modelling or subject shape detection.

6. The method according to claim 1, wherein sending the video sequence of the extracted moving image of at least the face of the person to the recipient device using a messaging application executed on the sender device.

7. The method according to claim 1, wherein at least the sender device is a mobile hand held communication device.

8. A system for providing an augmented reality image, comprising:
   a sender device and a recipient device; the sender device comprising:
      a first camera configured to record a video of a live camera view including a person and a first background; and
      a first processor configured to extract a moving image of at least a face of the person from the video of the live camera view to create a video sequence, the extracted moving image of at least the face of the person excluding images of the first background from the live camera view, wherein the video sequence is sent to the recipient device;
   the recipient device comprising:
      a second processor configured to superimpose the video sequence of the extracted moving image of at least the face of the person received from the sender device on a second background of a second display of the recipient device,
      wherein the second background is a desktop or an app skin presented in the second display of the recipient device and wherein the second processor anchors and scales the video sequence of the extracted moving image of at least the face of the person with respect to the desktop or the app skin presented in the second display of the recipient device.

9. The system according to claim 8, wherein the video sequence of the extracted moving image of at least the face of the person is sent to the recipient device using a messaging application executed on the sender device.

10. The system according to claim 8, wherein at least the sender device is a mobile hand held communication device.

11. A messaging system, comprising:
   a plurality of communicating devices that includes a mobile sending user device and a receiving user device;
   wherein the mobile sending user device comprises:
      a camera configured to record a video of a live camera view including a person and a first background; and
      a processor configured to extract a moving image of at least a face of the person from the video of the live camera view to create a video sequence, the extracted moving image of at least the face of the person excluding images of the first background from the live camera view, wherein the video sequence is sent to the receiving user device;
   wherein the receiving user device comprises:
      a processor configured to superimpose the video sequence of the extracted moving image of at least the face of the person received from the mobile sending user device on a second background of a display of the receiving user device,
      wherein the second background is a desktop or an app skin presented in the display of the receiving user device and wherein the processor of the receiving user device anchors and scales the video sequence of the extracted moving image of at least the face of the person with respect to the desktop or the app skin presented in the display.

* * * * *